(12) United States Patent
Wong

(10) Patent No.: US 6,988,183 B1
(45) Date of Patent: Jan. 17, 2006

(54) METHODS FOR INCREASING INSTRUCTION-LEVEL PARALLELISM IN MICROPROCESSORS AND DIGITAL SYSTEM

(76) Inventor: Derek Chi-Lan Wong, 1341 Echo Valley Dr., San Jose, CA (US) 95120

( * ) Notice: Subject to any disclaimer, the term of this patent is extended or adjusted under 35 U.S.C. 154(b) by 0 days.

(21) Appl. No.: 09/340,172

(22) Filed: Jun. 25, 1999

Related U.S. Application Data

(60) Provisional application No. 60/090,782, filed on Jun. 26, 1998.

(51) Int. Cl.
*G06F 9/38* (2006.01)

(52) U.S. Cl. .................................................... 712/208
(58) Field of Classification Search ................. 712/208
See application file for complete search history.

(56) References Cited

U.S. PATENT DOCUMENTS

| | | | |
|---|---|---|---|
| 5,446,912 A | | 8/1995 | Colwell et al. |
| 5,481,743 A | | 1/1996 | Baxter |
| 5,630,082 A | | 5/1997 | Yao et al. |
| 5,632,023 A | | 5/1997 | White et al. |
| 5,638,525 A | * | 6/1997 | Hammond .................. 712/209 |
| 5,651,125 A | | 7/1997 | Witt et al. |
| 5,758,142 A | * | 5/1998 | McFarling et al. ......... 712/239 |
| 5,781,752 A | * | 7/1998 | Moshovos et al. .......... 712/216 |
| 5,787,287 A | * | 7/1998 | Bharadwaj .................. 717/144 |
| 5,826,089 A | * | 10/1998 | Ireton ............................. 717/7 |
| 5,903,749 A | * | 5/1999 | Kenner et al. .............. 712/226 |
| 5,903,750 A | * | 5/1999 | Yeh et al. .................... 712/236 |
| 5,911,057 A | * | 6/1999 | Shiell .......................... 712/217 |
| 5,913,049 A | * | 6/1999 | Shiell .......................... 712/215 |
| 5,941,983 A | * | 8/1999 | Gupta et al. ................ 712/214 |
| 5,948,097 A | * | 9/1999 | Glew et al. ................. 712/220 |
| 5,978,900 A | * | 11/1999 | Liu et al. .................... 712/216 |
| 6,016,540 A | * | 1/2000 | Zaidi et al. ................. 712/214 |
| 6,105,124 A | * | 8/2000 | Faber ......................... 712/208 |
| 6,247,094 B1 | * | 6/2001 | Kumar et al. ............... 711/118 |
| 6,367,004 B1 | * | 4/2002 | Grochowski et al. ....... 712/226 |

OTHER PUBLICATIONS

J. Johnson, *Expansion Caches for Superscalar Machines*, A Doctoral Dissertation in Electrical Engineering Department at Stanford University, Mar. 1996, 183 pages, Stanford, CA, USA. File downloaded from Internet.

E. Rotenberg et al, "Trace Cache: a Low Latency Approach to High Bandwidth Instruction Fetching", Proceedings of the $29^{th}$ Annual Symposium on Microarchitecture, Dec. 2-4, 1996, IEEE, New Jersey, USA. File downloaded from Internet.

E. Rotenberg et al, "Trace Processors", Proceedings of Micro-30, Dec. 1-3, 1997, IEEE, USA. File downloaded fron Internet.

J. Crawford and J. Huck, "Next Generation Instruction Set Architecture". Presentation slides from 1997 Microprocessor Forum conference. Oct. 14, 1997, San Jose, CA. File downloaded from intel.com Web site.

(Continued)

*Primary Examiner*—Eric Coleman

(57) ABSTRACT

Our micro-architectural method increases the performance of microprocessor and digital circuit designs by increasing the usable instruction-level parallelism during execution. The method can be applied to substantially increase the performance of processors in a broad range of instruction set architectures including CISC, RISC, and EPIC designs. Code blocks of instructions are transformed from the original instruction set architecture to be executed into a new instruction set architecture by an instruction stream transformation unit. The transformed code blocks are then cached in an instruction stream cache. The transformation process increases processor performance by substantially increasing the instruction-level parallelism available during execution.

42 Claims, 4 Drawing Sheets

OTHER PUBLICATIONS

Figure 1:
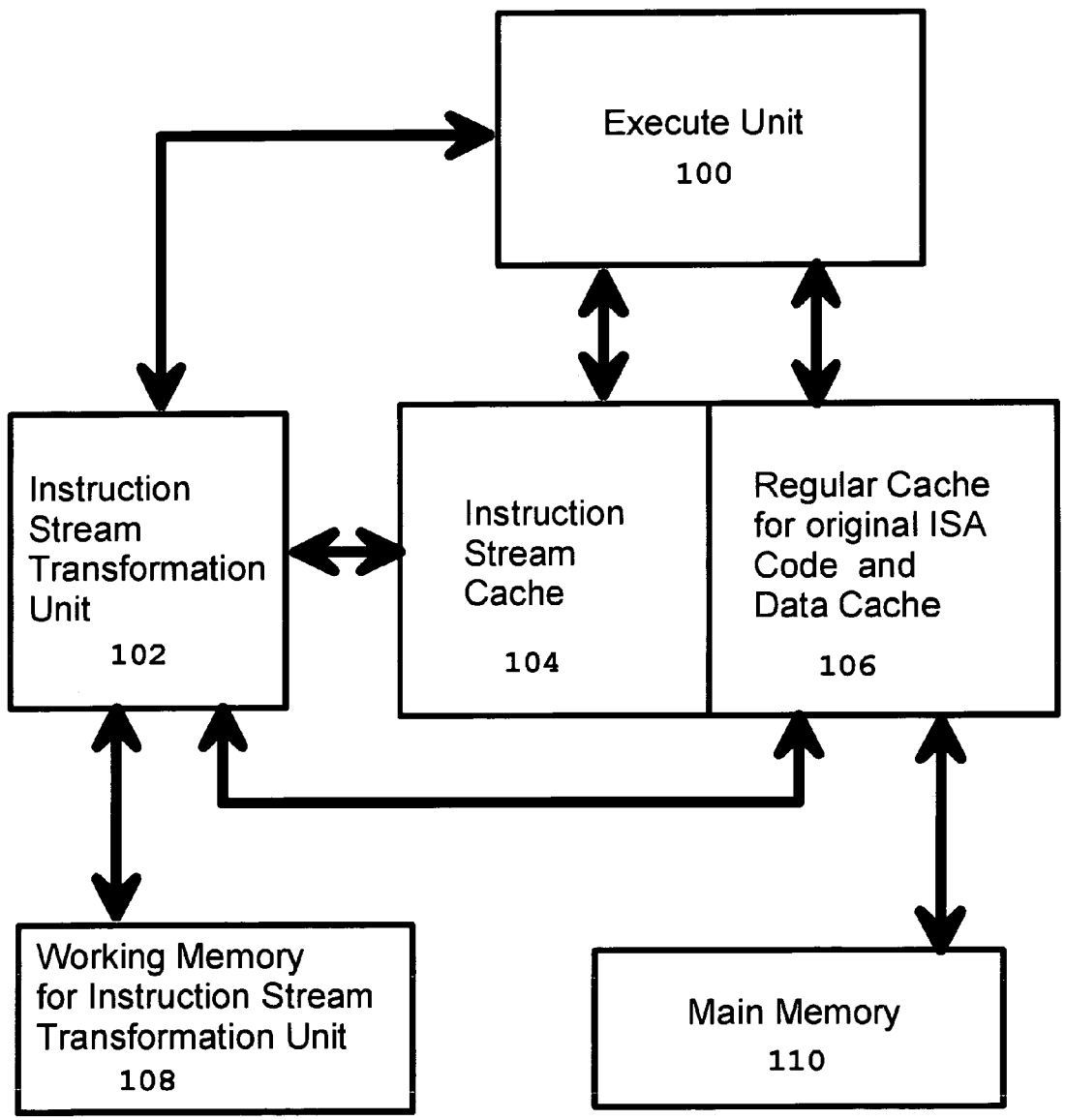
Figures 2, 3:
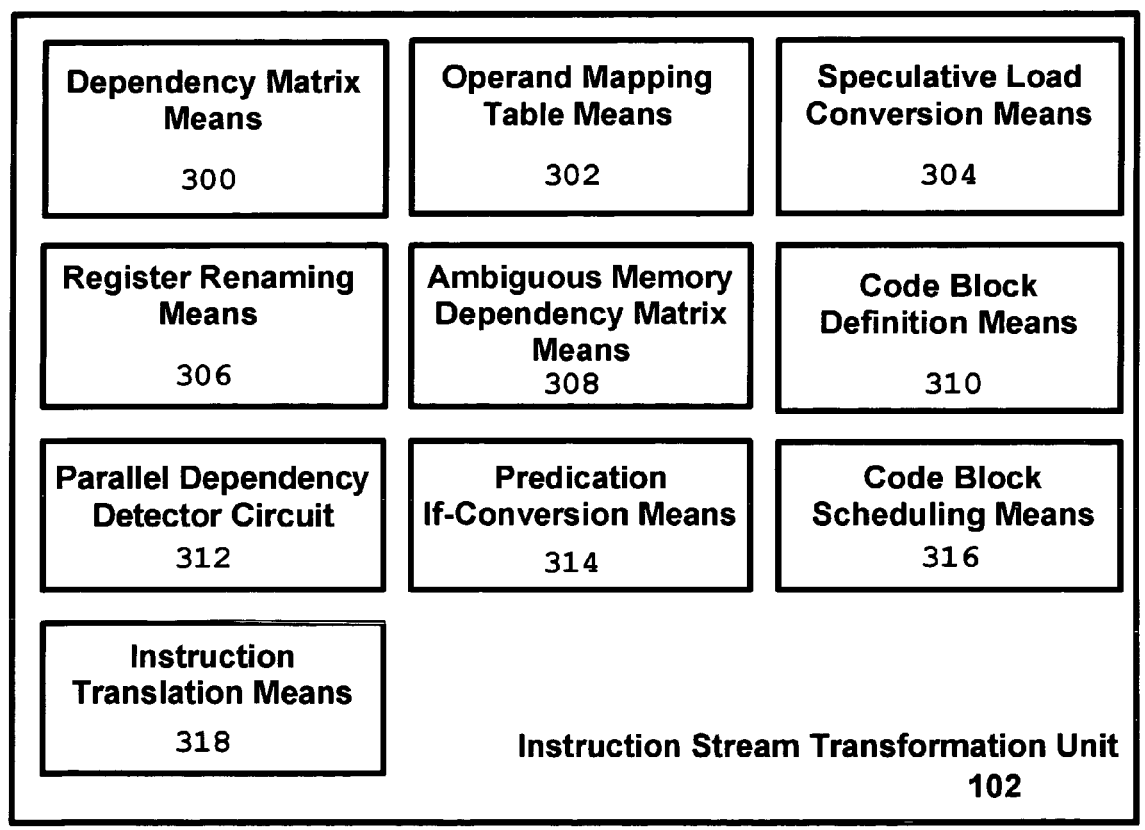
Figure 6:
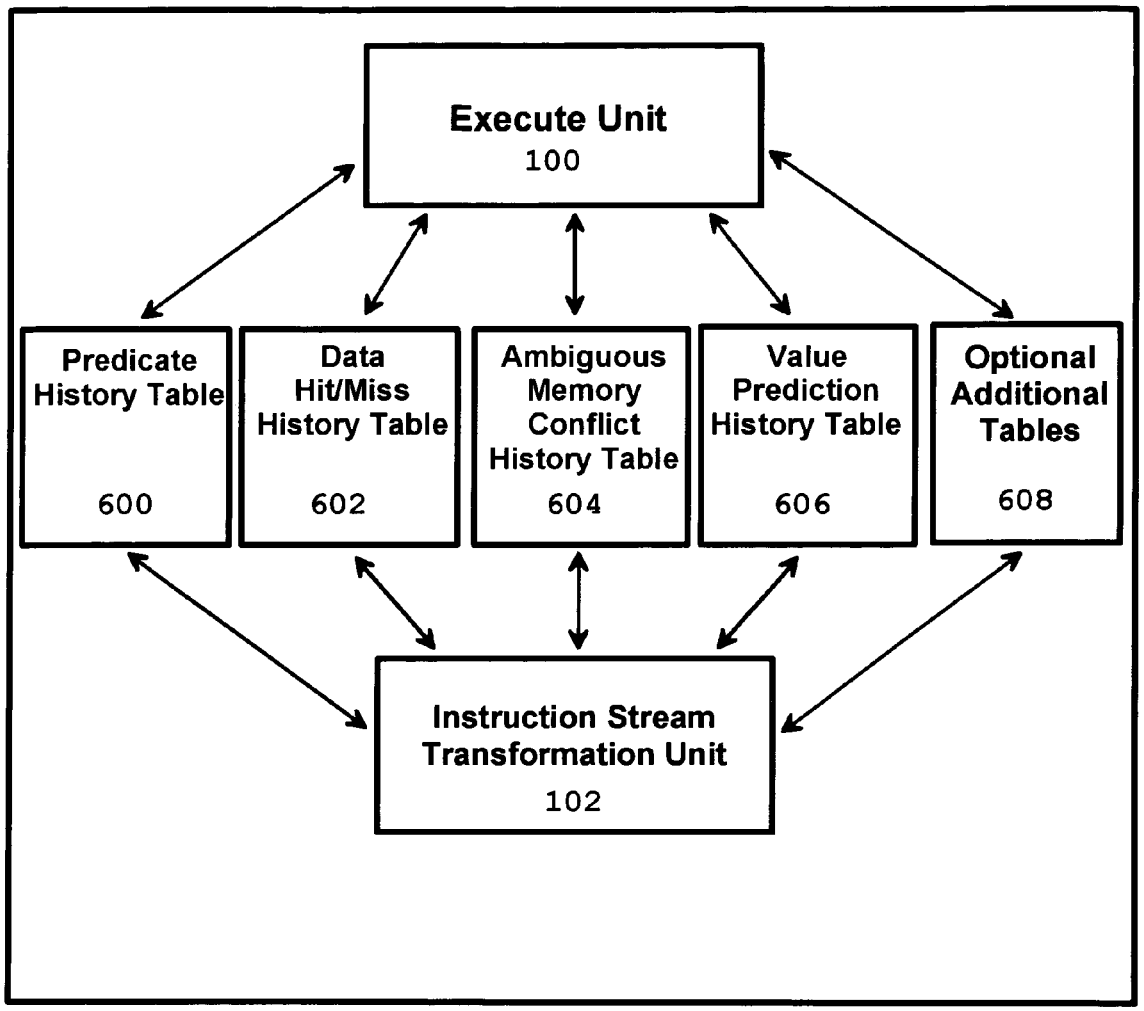

J. Crawford and J. Huck, "Motivations and Design Approach for the IA-64 64-bit Instruction Set Architecture." Transcript from 1997 Microprocessor Forum conference. Oct. 14, 1997, San Jose, CA. File downloaded from intel.com Web site.

Intel, "The Next Generation of Microprocessor Architecture: A 64-bit Instruction Set Architecture (ISA) based on EPIC Technology"—a Web page. Oct. 1997. Web page downloaded from intel.com Web site.

D. Gallagher et al, "Dynamic Memory Disambiguation Using the Memory Conflict Buffer", Proceedings of ASPOLOS-VI conference, Oct. 1994. File downloaded from Internet.

K. Wang and M. Franklin, "Highly Accurate Data Value Prediction using Hybrid Predictors", Proceedings of Micro 30. Dec. 1-3, 1997, IEEE, New Jersey, USA. File downloaded from Internet.

D. August et al, "A Framework for Balancing Control Flow and Predication", 1997 paper, Center for Reliable and High Performance Computing, University of Illinois, Urban-Champaign, IL. File downloaded from Internet.

S. Mahlke et al, "A Comparison of Full and Partial Predicated Execution Support for ILP Processors", ISCA-22, Jun. 1995. Center for Reliable and High Performance Computing, University of Illinois, Urban-Champaign, IL. File downloaded from Internet.

* cited by examiner

| TAG | | | INSTRUCTION STREAM DATA |
| --- | --- | --- | --- |
| Hyperblock ID | Line | Flag | |
| 100732 | 0 | 1 | xxxx xxxx xxxx xxxx xxxx |
| 100732 | 1 | 0 | xxxx xxxx xxxx xxxx xxxx |
| 100732 | 2 | 0 | xxxx xxxx xxxx xxxx xxxx |
| 074358 | 0 | 1 | xxxx xxxx xxxx xxxx xxxx |
| 074358 | 1 | 0 | xxxx xxxx xxxx xxxx xxxx |
| 074358 | 2 | 0 | xxxx xxxx xxxx xxxx xxxx |
| 074358 | 3 | 0 | xxxx xxxx xxxx xxxx xxxx |
| 324239 | 0 | 1 | xxxx xxxx xxxx xxxx xxxx |

|   |   |   |   |   |
|---|---|---|---|---|
| 0 | 0 | 0 | 0 | 0 |
| 1 | 0 | 0 | 0 | 0 |
| 0 | 0 | 0 | 0 | 0 |
| 0 | 3 | 0 | 0 | 0 |
| 0 | 0 | 0 | 0 | 0 |

*Figure 4*

|   |   |   |   |   |
|---|---|---|---|---|
| 0 | 0 | 0 | 0 | 0 |
| 1 | 0 | 0 | 0 | 0 |
| 0 | 1 | 0 | 3 | 0 |
| 0 | 0 | 0 | 0 | 2 |

*Figure 5*

METHODS FOR INCREASING INSTRUCTION-LEVEL PARALLELISM IN MICROPROCESSORS AND DIGITAL SYSTEM

REFERENCE TO RELATED APPLICATIONS

This patent application is a follow-up to provisional patent application No. 60/090,782 filed on Jun. 26, 1998 with the U.S. Patent and Trademark Office. Care has been taken not to add design ideas to this regular patent application which were not described in the original provisional patent application. There are more drawings in this regular patent application than in the provisional patent application due to the requirement for formal drawings for claims presented in a regular patent application; however, the ideas contained within these added drawings were already presented in the provisional patent application in text form. These new drawings only serve as illustrations and examples for the ideas already presented in the provisional application.

BACKGROUND

1. Field of Invention

One important method of increasing microprocessor performance is to increase the average instructions executed per cycle (IPC) by using various techniques that take advantage of instruction-level parallelism.

In this patent application, we describe new micro-architectural techniques which take advantage of more instruction-level parallelism than prior-art micro-architectures, thus improving IPC compared to prior art designs.

We assume that the reader has a background in prior-art processor design, including cache and execute unit micro-architectures.

BACKGROUND

2. Prior Art

A. Conventional Superscalar Designs for RISC/CISC Instruction Sets

Conventional superscalar processors are limited in what instruction level parallelism can be extracted, or used, from the instruction stream (the sequence of instructions executed at run-time for running program(s)). Inherent limiting factors that are present in the instruction stream include:
  High frequency of branches, limiting the average number of instructions fetched per cycle and causing time-wasting pipeline bubbles due to branch mis-prediction.
  Data dependencies, including
    Register hazards, i.e. dependencies between different instructions using the same register
    Possible memory load/store hazards that are not resolved until run-time, i.e. load and store instructions that might or might not access the same memory location Various techniques have been employed in conventional superscalar processors to address some of the above limitations. The following techniques have been developed for use at run-time in the execute unit:
  Sophisticated branch prediction, to reduce pipeline bubbles due to branch mis-prediction
  Next-address fields in cache lines, to improve instruction fetching
  Speculatively issuing instructions for several levels of predicted branches, rather than just one
  Register renaming, to remove some of the register dependencies
  Instruction scheduling techniques in software compilers to maximize the parallelism which is extracted by the superscalar processor
  Translation of CISC instructions into equivalent groups of RISC-like operations, which makes the operations more uniform and therefore improves pipeline scheduling.
  Out-of-order execution at run-time, which helps to find more parallelism in the instruction stream and reduces the impact of individual load/store instructions stalling due to memory latency effects (cache misses).

Limitations of Prior-Art Superscalar Processors

These techniques give today's superscalar processors a substantial performance advantage over in-order, single-instruction-issue-per-cycle designs. Most high-performance microprocessors in the past few years have used some degree of superscalar techniques. Nevertheless, today's microprocessors achieve an average IPC only around 2 instructions/cycle on typical integer code. Although more parallelism may be available, the conventional superscalar designs have difficulty extracting it.

Some studies have shown that adding additional parallel functional units to a conventional superscalar design gives only a small incremental speed-up beyond a certain number of functional units. The speedup diminishes because the conventional mechanisms of instruction fetch and issue limit the parallelism rather than the availability of functional units.

Another limitation of conventional superscalar designs is the hardware complexity of managing a large number of instructions in the pipeline at once.

If one tries to build a conventional superscalar processor with a large number of parallel functional units, the hardware required to manage the potential dependencies between different instructions becomes unwieldy. This hardware complexity grows approximately linearly with the number of instructions being issued, executed, or retired per cycle and approximately linearly with the maximum total number of instructions in the pipeline. The overall complexity growth can be approximately quadratic if the number of instructions being issued, executed, or retired and the maximum total number of instructions grow at the same time, as is often the case.

Hence, if machine B has twice the number of instruction units in parallel and twice the number of maximum total instructions in the pipeline compared to machine A, the hardware complexity of machine B's instruction pipeline management will be approximately 4 times the complexity of machine A's instruction pipeline management.

This growth in pipeline management makes super-wide superscalar designs more difficult to implement well and at reasonable cost. The complexity of the pipeline management would take up a substantial amount of die area. It could also slow down the cycle period of the processor compared to a less wide processor, which would decrease performance. Designers try to avoid this cycle time slowdown, but eventually, at a certain complexity level, it will become difficult to avoid this.

The complexity of management can also increase the number of pipeline stages, which increases the branch mis-predict penalty and data dependency hazard penalties. Any additional pipeline stages further increase the management complexity by increasing the maximum number of instructions in the pipeline at once.

Differences Between Our Techniques and Prior-Art Super-scalar Techniques

In conventional microprocessors, the hardware techniques listed earlier for enabling high-performance execution generally are performed at run-time in the execute unit. Instructions are read in at run-time and decoded. The super-scalar techniques above are applied to instructions between the decode pipeline stage and the commit pipeline stage which retires instructions.

In contrast, our techniques perform transformation and scheduling of instructions outside of the execute unit and the run-time execution process. New hardware structures are proposed to implement our techniques. Our techniques and structures enable more instruction-level parallelism and performance than run-time scheduling alone.

B. Intel/HP EPIC

Intel and HP have jointly proposed a new type of instruction set, called EPIC (Explicitly Parallel Instruction Computing), and their instruction set IA-64, which takes advantage of more instruction level parallelism by offering newer instruction set techniques such as full predication and speculative loads. These newer techniques were not developed by researchers until after the initial definition of most commercial RISC and CISC instruction sets, so adding these techniques would require modifying or adding to the instruction set architecture of these RISC and CISC processor families.

The EPIC-type instruction set "exposes" the parallelism to the compiler, so that the compiler is responsible for much of the instruction sequencing, as in prior-art VLIW designs.

The resulting instruction can be implemented both by static in-order execution and dynamic out-of-order execution micro-architectures. The intent of the instruction set design is to enable simpler static in-order execution designs to have good performance by using the compiler to schedule instructions in parallel. The stalls caused by loads/stores are minimized by using the speculative load technique as well as perhaps other undisclosed techniques.

The basic philosophies of EPIC as stated by Intel/HP are:
Move the instruction scheduling to the compiler instead of doing it in hardware. This reduces or eliminates much of the instruction management complexity. Also, the compiler can examine larger windows of instructions, possibly improving the instruction schedule.
Add new instruction techniques such as full predication and speculation to improve available instruction parallelism.
Use a large number of registers in the instruction set to eliminate the need for register renaming.

The EPIC techniques represent a substantial advance over prior-art instruction sets and their corresponding micro-architectures. This work also highlights the fact that changes in the instruction set may be necessary to take advantage of new techniques of extracting more instruction parallelism. The EPIC instruction set design permits a more parallel schedule of instructions at compile-time than older RISC/CISC instruction sets.

C. Prior Art Research in Instruction Grouping and Scheduling

The following is a summary of some research known to the inventor in hardware instruction grouping, scheduling, and caching.

J. Johnson has proposed a concept called Expanded Parallel Instruction Cache. When instructions are cached in this method, some analysis of instruction dependencies is performed along with pre-decoding of the instructions. Each group of consecutive instructions that are not inter-dependent is placed in-order into an instruction tuple. Instructions taken after a branch can also be added into an instruction tuple. The cache that stores this representation of instructions is called an expanded parallel instruction cache.

Trace caches and similar concepts have been proposed to group instructions together based on likely execution paths. Since branch prediction penalties and instruction fetching after branches impact performance, trace caches have been proposed to group instructions together based on previous execution paths. A trace can group together instructions across branches and is stored as a contiguous unit within the trace cache. Subsequent executions are likely to reuse the trace and therefore will avoid some of the instruction fetching and branch prediction overhead normally associated with branches.

Our transformation techniques are much more extensive than the techniques in the expanded parallel instruction cache or trace cache techniques. Unlike our techniques, these prior-art techniques do not perform more sophisticated performance-enhancing operations such as Out-of-order instruction scheduling,
Speculative loading,
Predication if-conversion,
Dynamic memory disambiguation,
Semi-dynamic scheduling, and
Static register renaming.

Register renaming in Johnson's design is limited to dynamic register renaming done at run-time as a conventional part of a super-scalar execute unit. In contrast, our techniques employ static register renaming as part of the process of instruction scheduling performed prior to run-time execution.

Objects and Advantages of Our Techniques

Our techniques provide substantially faster performance and improved flexibility over prior-art techniques. Objects of our techniques include but are not limited to the following:

1. Providing faster performance via greater instruction-level parallelism, especially for existing instruction set architectures.
2. Enabling processor implementations of older instruction set architectures to take advantage of newer micro-architectural ideas for improved performance.
3. Improving flexibility and extensibility of a family of processor implementations while retaining binary code compatibility.

Our proposed micro-architecture techniques have several main advantages:

1. These techniques can take advantage of more instruction level parallelism than prior-art superscalar designs for existing RISC/CISC instruction sets. Potential speed improvement may approach a factor of 2 or more.
2. At the same time, the management complexity associated with issuing a large number of instructions in parallel is substantially reduced. This makes wide-parallel micro-architectures more practical to implement without die area or cycle time penalties.
3. The micro-architectural techniques proposed are extensible while still executing the same instruction set (RISC, CISC, or EPIC). Thus, additional techniques for increasing parallelism can be incorporated into future processors without using incompatible instruction sets. This is a major advantage over the approach of defining a new instruction set to support new micro-architectural techniques.

For example, the Intel/HP instruction set IA-64 may take advantage of some parallelism-extracting techniques but not incorporate others that are even newer or not yet developed, such as value prediction. Adding those techniques later may require instruction set modifications. In contrast, our micro-architecture is extensible and allows future generations of processors to take advantage of more parallelism techniques while maintaining binary code compatibility.

Furthermore, suppose that there are different implementations of our proposed micro-architecture having different numbers of parallel execution resources. A typical microprocessor family has several generations over time corresponding to improvements in chip fabrication technology. The number of functional units and latencies of the functional units vary with each generation. Using our micro-architectural techniques, these different generations can execute at high-speed using the same binary program because good code scheduling can be done by the micro-architecture. The need to recompile for each new processor version is greatly reduced. Using the same binary programs eliminates the complexity of maintaining multiple versions of software for different processor implementations. This can be a substantial simplification for both software manufacturers and end-users of software. In contrast, conventional statically-scheduled processor micro-architectures (a possible option for IA-64, but not a requirement) require recompilation for optimal performance on new processor generations.

Additional objects and advantages of our techniques shall be made apparent by the detailed specification provided in this patent application.

LIST OF FIGURES

FIG. F-1: Our Micro-Architecture. An Instruction Stream Transformation Unit reads original ISA code blocks from the Regular Cache and creates equivalent transformed ISA code blocks in the Instruction Stream Cache. The Execute Unit can read and execute both original and transformed ISA code blocks. Transformed ISA code blocks have greater parallelism and can therefore execute at a faster rate.

FIG. F-2: Example of Instruction Stream Cache Lines. A common hyper-block ID groups together each hyper-block. The start flag is set only for the first line in each hyper-block.

FIG. F-3: Instruction Stream Transformation Unit. An instruction stream transformation unit contains means to perform various operations to transform code blocks from an original ISA to a transformed ISA.

FIG. F-4: Example of a forward dependency matrix. This matrix represents dependencies between instructions using non-zero entries. In this example, instruction #2 has a 1-cycle delay dependency on instruction #1. Also, instruction #4 has a 3-cycle delay dependency on instruction #2.

FIG. F-5: Example of an operand mapping table. This table uses non-zero entries to represent possible writes to operands by instructions. This example is sized for 4 operands and 5 instructions. The rows correspond to operands, and the columns correspond to instructions. Operand #2 may be written by instruction #1 with an estimated execution delay of 1. Operand #3 may be written either by instruction #2 with a delay of 1 or instruction #4 with a delay of 3. Operand #4 may be written by instruction #5 with a delay of 2.

FIG. F-6: Run-time history tables. These run-time history tables are used to communicate run-time behavior about the code to the instruction stream transformation unit. The history is used to reschedule the code in semi-dynamic scheduling techniques.

SUMMARY OF OUR TECHNIQUES

We have created several new design ideas which operate together as a high-performance micro-architecture. This micro-architecture is shown inFIG. F-1:

See FIG. F-1.

A modified cache hierarchy is built that can hold standard as well as reformatted instruction stream lines. The portion of the cache which holds the reformatted instruction stream lines is called the instruction stream cache 104.

An instruction stream transformation unit (IS transformation unit) 102 is added to convert the original instruction code into internal microinstruction format. This internal format may use a different instruction set (e.g. RISC-like microinstructions translated from a CISC instruction stream), have instruction methods for enhancing available parallelism (e.g. predication and speculative loads as in IA-64), and can have detailed data dependency, instruction commit, and other notations. The IS transformation unit 102 does rescheduling of the instruction stream as well. The IS transformation unit 102 can have its own working memory 108.

An execute unit 100 can execute both the original instruction set or the internal microinstruction format and can switch between the two dynamically. The execute unit performs the run-time processes of instruction fetch, issue, execute, and commit. Program counter and other information from the execute unit is fed back to the IS transformation unit to determine which blocks of instructions are to be transformed into the internal microinstruction format.

There are many possible variations combining and detailing these ideas. A description of some possibilities is listed below.

The basic premise of this micro-architecture is that instruction scheduling and instruction transformation can be done by a separate IS transformation unit 102, prior to instruction fetch by the execute unit 100. The transformation unit 102 converts the code into a more parallelized format by taking advantage of newer instruction set ideas such as predication and speculation. The resulting set of instructions is then scheduled by the transformation unit 102 knowing resource limits and operation latencies of the execute unit 100. This instruction stream is then written out to the instruction stream cache 104 in a format which is parallel and can note dependencies and other information useful to the execute unit 100.

In addition to creating more parallelized code than would be possible without transforming the instruction stream to a new microinstruction format, the IS transformation unit 102 relieves the execute unit 100 from having to do most of the scheduling and dependency analysis. When executing the reformatted instruction stream, the execute unit 100 can either be statically-scheduled or can be a dynamic out-of-order execute unit.

In the first case, the stream code in the cache 104 contains the schedule, which is executed by the statically-scheduled execute unit 100.

In the second case, the stream code is a guideline for scheduling. The stream code can explicitly contain some or all of the dependency information to aid in dynamic execution.

The execute unit 100 uses instructions from the instruction stream cache 104 whenever possible, i.e. whenever the instruction stream cache hits. This is the high-speed, highly-parallel execution mode.

Additionally, the execute unit 100 can still execute the original instruction code, although not as quickly. Therefore, when there is a miss from the instruction stream cache, the execute unit 100 begins to execute the original instructions which are fetched from the regular cache 106/main memory 110 hierarchy. The execute unit 100 switches dynamically between the two types of instruction sets depending on whether the instruction stream cache 104 hits. This allows execution to continue without having to wait for the instruction stream transformation process.

The following sections present more details of our algorithms. There are a number of choices which are design-specific and some components which are optional. We present the main embodiment along with some of the choices and options which can provide alternative embodiments. Description of the structure and operation are both included in the following sections.

We describe our design in several parts:
1. First, we present the idea of transforming code blocks and defining these code blocks.
2. Next, the cache design for this type of processor is presented. The idea of the instruction stream cache is described.
3. We then describe the details of how to transform code blocks using the instruction stream transformation unit. The operation and capability of sub-parts of this unit are described.
4. Next, details of an example instruction scheduling algorithm are presented. This scheduling algorithm can be implemented as part of the instruction stream transformation unit.
5. The ideas of static, dynamic, and semi-dynamic scheduling are described. Representation requirements for the transformed instruction stream are discussed. Semi-dynamic scheduling can improve performance further. The idea of using history tables to support this semi-dynamic scheduling is introduced.
6. Details of the execute unit are then presented. Methods of supporting execution of both the original and transformed instruction sets are described.
7. Methods of representing dependency information are described.
8. A lite version of our method is described which omits some components to simplify the implementation. This lite version can be very useful in some situations.

Transforming the Instruction Stream in Code Blocks

The transformation of the instruction stream is done to sections or blocks of code.

We designate the code prior to transformation as the original machine code in the original instruction set architecture (or original ISA). The code after transformation is designated as the transformed machine code in the transformed instruction set architecture (or transformed ISA).

For purposes of this example main embodiment, the system will transform blocks of code which have only a single entry point at the top of the code block and one or more possible exits from the middle or end of the code block. In compiler literature, these blocks are called super-blocks in non-predicated code and hyper-blocks in predicated code. By restricting the code to a single entry point, the code can be freely re-ordered without the complication of having other possible entry points requiring the correct sequence of instructions. Since we most likely intend to support predication in the transformed instruction stream, we assume for purposes of this discussion that we are working with blocks of original machine code that can be transformed into hyper-blocks.

The original ISA may not support predication, so the hyper-block in original code may have multiple entry points prior to converting the code to use predication (called if-conversion in compiler literature). After if-conversion and other transformations, the block of code will have only one entry point at the start of the block and no other entry points.

In a compiler, it is possible to identify hyper-blocks through code analysis. In the IS transformation unit, it may be more difficult to analyze the original machine code to ascertain that there are no additional jumps or branches that enter the middle of a particular block of code. In theory, that could require analyzing the entire program. Hence, some method is needed to handle this. We have two methods:
1. Method #1: Use "presumed" hyper-blocks.

A "presumed" hyper-block is a block of code that has no jumps/branches into the middle of the block based on local analysis of nearby code. Therefore, it is assumed to be a hyper-block and is designated as a "presumed" hyper-block. In this case, we go ahead and transform the instruction stream but only allow use of the transformed stream if there is a jump/branch to the beginning address of the block.

If there is a branch to an address in the middle of the block, it will not hit this transformed instruction stream in the cache. Instead, it will either hit a regular instruction line (non-transformed), or it could hit the beginning address of a different presumed hyper-block.

The latter case is possible if we allow the IS transformation unit to transform presumed hyper-blocks that may be overlapping. This is an optional design decision that may be useful.

2. Method #2: Have the compiler find the actual hyper-blocks and put some notation into the machine code to designate hyper-blocks.

In this case, we need special instruction(s) to place the notation into the machine code. The special instruction(s) would act as NULL operations for machine implementations which do not perform IS transformation and would contain notation information for implementations which do perform IS transformation.

This second approach is strictly optional. The first approach is quite workable and is preferred if no modification of the original instruction set is desired or a lot of legacy code should be run without recompilation. Otherwise, the second approach can provide as good or better definitions of code blocks but does not work for legacy binaries without recompilation.

Cache Design: Regular and Instruction Stream Cache

The cache hierarchy includes both regular and instruction stream caches. In general, there can be N levels of cache where the 1st or lowest level is the primary cache (i.e. logically closest to the execute unit) and the Nth level is the highest level and typically largest cache. From the 1st to Kth levels, the cache level includes an instruction stream cache as well as a regular cache. The regular cache at each level can be either separate instruction and data caches (i.e.

Harvard architecture) or a unified cache. Misses at lower levels of regular cache are filled from higher levels of regular cache or the main memory. Misses at lower levels of instruction stream cache are similarly filled from higher levels of instruction stream cache.

The Kth level of instruction stream cache is filled by writes from the IS transformation unit and is not filled directly from higher levels of cache.

In practice, near-future microprocessor designs will probably have N=2 or 3 levels of cache and K=2 or 3 levels of instruction stream cache as well. It is more difficult to design a fast system with K=1 since the IS transformation unit will have to support a higher throughput than if K=2 or 3.

The primary or 1st level will contain both a regular cache and an instruction stream cache. The primary-level regular cache is typically split into regular instruction and regular data caches. Priority is given to hits from the instruction stream cache over hits from the regular instruction cache. This enables the fast mode of execution when possible. Reads from the instruction stream and regular cache can be done simultaneously for greatest speed.

Cache Design: Instruction Stream Cache

For purposes of this example implementation, we continue with the discussion in more detail assuming that the code is transformed in hyper-block units. Other units of transformation may also be possible.

The instruction stream cache at the primary level uses a tagging structure that only hits when access is begun from the entry point to a hyper-block and continues along a hyper-block. A number of methods can achieve this; one example method is described below.

An example implementation uses a special tag bit (called a start flag) for each line of the instruction stream cache which indicates whether the line is the start of a hyper-block:

- Lines from the instruction stream cache will be chained together to represent hyper-blocks. The first line in a chain will be tagged with the starting address of the hyper-block and the special tag bit=true.
- If the tag is true (start of hyper-block), then the line hits when the program counter address matches the tag address and there is a non-consecutive jump/branch to that address or a consecutive execution which proceeds to that address.
- If the tag is false (continuation of hyper-block), then the line hits only when the fetched address matches the tag address AND the execution order previously executed the previous line in the hyper-block chain. This can be ascertained by using a small circuit which analyzes if the previous valid instruction fetch came from the previous line in this hyper-block chain.
- One example method of managing the tag addresses of hyper-block lines in the instruction stream cache is as follows:
- Once the execute unit enters a hyper-block by fetching the first line of the hyper-block, fetches of subsequent hyper-block lines from the instruction stream cache can use fetch addresses consisting of a hyper-block ID and line number as described below rather than an original program counter address indicating corresponding original ISA instructions in regular memory space. The fetch of the first line in the hyper-block is still done using an original program counter address.
- We can give unique hyper-block ID's to each hyper-block chain to make it easier to follow a hyper-block chain. The original ISA address of the start of the hyper-block can be used as a unique ID. The hyper-block ID is used as part of the tag for each hyper-block line after the initial line in place of the original ISA address.
- The use of unique hyper-block ID's also allows overlapping presumed hyper-blocks to co-exist in the instruction stream cache even though they may overlap in original instruction memory addresses.
- Note that except for the first line in a hyper-block chain, the start of each hyper-block line may not correspond exactly to a particular program counter in regular instruction memory. This occurs because the transformation process may create a variable number of instructions, particularly when converting from CISC-type to RISC-type operations or converting to parallel instruction formats. Because of this, it may not make sense to use normal program counter addresses except when fetching the first line of a hyper-block. Instead, we can use one of the example alternative addressing methods indicated below:
- Once hyper-block ID's are assigned, each cache line containing part of a hyper-block can be uniquely identified using the hyper-block ID and a consecutive line number counting from the first line in the hyper-block. For example, a line may have a certain hyper-block ID and a line number=4 which means it is the 4th line in the chain of lines constituting this hyper-block.
- More generally, we can use pointers from one hyper-block line to the next consecutive hyper-block line. One example kind of pointer is a hyper-block ID plus line number. The pointer can be another kind of number, so long as each line has a unique number.
- These hyper-block ID's and line numbers are used only to fetch consecutive lines from the same hyper-block. Every branch or jump instruction in the transformed code can still address the target using an original ISA program address assuming the transformed code blocks are presumed hyper-blocks (meaning there are no branches allowed into the middle of the block). Each hyper-block can be entered via a tag hit for the original ISA program address corresponding to the start of the hyper-block. The regular cache is addressed using original ISA program addresses as usual. The original ISA program address can therefore be used to access the regular and instruction stream memory hierarchies for every branch or jump. (If blocks other than hyper-blocks are used and branches are permitted into the middle of transformed code blocks, then the target addresses for branches and jumps may require use of special addresses such as block ID's and offsets instead of or in addition to original ISA program addresses.)
- In summary, a cache hit to a line which is not the start of a hyper-block occurs when the line number and hyper-block ID (or pointer) of the line being fetched matches the line number and the hyper-block ID (or pointer) of a hyper-block in the cache.
- Conventional techniques can be used for organizing the cache, including hashed indices and set-associativity. This will determine exactly how the hyper-block ID's are stored as tags and if any bits can be omitted as part of the indexing/set associativity design.

See FIG. F-2

FIG. F-2 shows some example hyperblocks stored in an instruction stream cache. There are three hyper-blocks with ID's 100732, 074358, and 324239. The start flag is shown as set for first cache line of each hyper-block.

When an instruction stream cache level misses, subsequent levels of instruction stream cache can be accessed to fill misses. If the last level of instruction stream cache misses, the IS transformation unit may be instructed to find and transform the corresponding code.

Transforming Code Blocks using the Instruction Stream Transformation Unit

The key to increased parallelism and high performance is the process of instruction stream transformation. This is performed by the instruction stream transformation unit (IS transformation unit) which takes original code blocks and transforms them into more parallel instruction streams in the transformed code blocks.

The transformed code blocks are stored in the instruction stream cache hierarchy. The code blocks are accessed when tag matches occur between fetch addresses issued by the execute unit and tags of instruction stream cache lines.

As in previous sections, we continue this discussion using the example assumption that the code blocks being transformed are hyper-blocks in the transformed ISA.

The IS transformation unit is equipped with its own local memory which is used as a temporary working store. Generally, the first step in converting a code block is to copy it from the regular memory hierarchy into this local memory. The local copy can then be accessed and transformed using a series of steps without affecting the original copy in the regular memory hierarchy. Once the transformation is complete in local memory, the transformed code block can be written into the instruction stream memory hierarchy.

The transformation algorithm proceeds as a series of steps executed by the IS transformation unit. The exact transformations to be performed are dependent on the specific original and transformed ISA's. In many cases, the original ISA is already defined prior to the start of the this current processor design. The transformed ISA can be defined by the designer of the current processor design depending on what features are supported by the execute unit and the performance trade-offs of adding each feature. The performance trade-offs need to be calculated via architectural simulation. For example, predication may be a good feature of the transformed ISA if it provides a substantial performance boost over non-predicated ISA's.

The transformation unit can theoretically be implemented like a small general-purpose processor design executing a specified transformation algorithm. However, faster IS transformation unit implementations can employ some special-purpose hardware not found in ordinary general-purpose processors to speed up instruction transformation and scheduling.

The execute unit provides a general nullification capability for squashing instruction effects at the commit stage. Nullification is useful for executing predicated instructions and for speculatively executing conditional branches and instructions containing ambiguous dependencies. The IS transformation unit will assist in generating transformed code which takes advantage of this nullification capability by using predication and speculative loads.

The original ISA code should ideally be generated by a decent compiler which will perform transformations such as loop unrolling or software pipelining, redundant load elimination, etc.

The following is an example set of steps to be performed by the IS transformation unit. The following is just an illustrative list of steps as different embodiments may vary, and some implementations may use a subset of this list or a somewhat different list.
1. Identify a potential code block for conversion
2. Copy original ISA code block to local memory.
3. Translate instructions (e.g. converting CISC instructions to equivalent groups of RISC-like ops)
4. If-convert instructions to use predication
5. Convert instructions to use speculative loads
6. Perform static scheduling
7. Process dynamic memory disambiguation data (if necessary)
8. Write transformed ISA code to the instruction stream cache hierarchy Some implementations may perform steps 4 to 6 more than once to further optimize if-conversion decisions.

The concept of an instruction stream transformation unit is fairly general and can encompass a fairly minimal set of steps (as in our lite version presented later) or can be extended to include additional architectural and code scheduling techniques.

We present here example methods and hardware units for several examples of using capabilities in the transformed ISA which are not available in the original ISA:
Predication If-Conversion,
Hyper-block definition,
Splitting of a hyper-block into two paths (hyper-block and alternate path),
Speculative loads, and
Support for dynamic memory disambiguation.
In addition, we explain how to implement
Static instruction scheduling,
Register renaming,
Explicit indication of dependencies in the transformed ISA code, and
Precise interrupts (in a later section)

The following details about possible implementations are just examples meant to illustrate our concepts. Other methods of detailed implementation are certainly possible under our proposed design.

See FIG. F-3

FIG. F-3 shows an example Instruction Stream Transformation Unit. It is capable of a number of different operations that are combined to perform transformation of the code from the original ISA to the transformed ISA.

The following detailed description will focus on the important novel steps of the instruction stream transformation process.

The process of individual instruction translation (e.g. converting CISC instructions to equivalent groups of RISC-like ops) is relatively straightforward. Instruction translation has been performed in prior-art architectures during run-time in the execute unit. The IS transformation unit 102 can perform a similar type of translation on a code block in the instruction translation means 318.

Code Block Definition

Code block definition means 310 (FIG. F-3) are within the IS transformation unit 102 and take input at run-time from the execute unit 100 (FIG. F-1).

The first step in transforming a block of code is to decide on the potential boundaries of the block. Let's continue with our example design assuming that the blocks to be re-organized are hyper-blocks.

The beginning of the hyper-block can be the target of a jump, call, or taken branch as indicated by the execute unit. As execution continues through sequential instructions and forward branches (assumed to be if-then-else constructs), the code executed will be considered to be part of one potential hyper-block. This grouping into one potential hyper-block will be performed while the execute unit is executing the code block until a hyper-block termination is reached or the size of the block of code becomes too large to be efficiently transformed.

Instructions that terminate a potential hyper-block definition during this run-time execution include:
  procedure call and return instructions,
  backward branches or jumps,
  jumps to addresses which are not nearby, and
  forward branches to addresses which are not nearby.

The range of addresses which are considered "nearby" is design-specific and is dependent on the size of the block of code which can be transformed efficiently at once.

If the potential hyper-block is not terminated by a backward branch or jump, then the next potential hyper-block can begin where the previous one ended.

When the addresses corresponding to the ends of the potential hyper-block are known, these addresses can be passed to the IS transformation unit, which will then fetch the potential hyper-block and begin transformation.

This code is considered a potential hyper-block rather than an actual hyper-block because the process of predication if-conversion discussed next may not choose to incorporate all of the code between the addresses into one hyper-block. If not all the code is incorporated, then the excluded code can either be separately transformed as other code block(s) or the excluded code can be left as original ISA code rather than transformed.

Also, the execution process may skip over a backward branch or jump or other terminating condition if it is located in a conditional section of code which is controlled by a not-taken condition. Therefore, the potential hyper-block that is initially identified using the above process may actually be terminated earlier during the code transformation process.

Predication If-Conversion

Predication if-conversion is the process of converting if-then-else constructs using conditional branch instructions in original ISA code into predicate-defining instructions and predicated instructions in the transformed ISA code. This is performed within the IS transformation unit 102 by the predication if-conversion means 314 (FIG. F-3).

The if-conversion process begins after the code block boundaries have been identified as indicated above. During this process, some code may be excluded from the hyper-block which results in breaking the potential hyper-block into a hyper-block and some additional code, which can be transformed as separate code blocks or left as original ISA code.

As indicated in prior-art compiler literature discussing predication, all if-then-else constructs can potentially be converted into predicated constructs provided the ISA (in this case, the transformed ISA) supports full predication of the set of instructions used in a code block, but this may not always be optimal for performance. Hence, it is necessary to perform analysis to determine the benefits of doing if-conversion for each if-then-else construct.

The performance trade-off of using predication is machine-dependent. In this case, we prefer an execute unit design which can squash instructions based on predicate values at both the commit pipeline stage and the pipeline stage following instruction fetch (in this case, we call it the decode stage). Thus, once a predicate value is known in time for decode-stage squashing, the squashed instructions need not proceed to data fetch, execute, and commit stages.

Instructions squashed in the decode stage are not queued for these later stages. This improves the performance trade-off for predication vs. conditional branches in favor of more extensive use of predication. The main performance impact of instructions squashed in the decode stage will be to consume some instruction fetch and decode bandwidth. The effect of squashed instructions on overall performance can then be minimized by providing a high fetch and decode bandwidth. Potentially, we can also squash instructions in the stages between decode and commit, but the most convenient stages for squashing appear to be the decode and commit stages.

Several algorithms and heuristics have been proposed in prior-art literature for selecting which if-then-else constructs to convert for optimal performance. Any method can potentially be implemented. Simpler techniques improve conversion speed but may not be as good at optimizing performance.

The performance impact of squashed instructions is minimized by:
  Allowing early squashing (i.e. in the decode stage), and
  Having sufficient execution and data fetch resources. Simulations showing performance improvement using predication in 4-issue vs. 8-issue superscalar machines shows that predication becomes more beneficial as the machine width increases.

Given that future processors are assumed to have both early squashing and an issue width much larger than 4, the benefit of more complex algorithms/heuristics for determining if-conversion will be reduced in the future. Processors being built in 1998 have issue widths of 4 or more, so processors being designed for production in the years 2001 and beyond can have issue widths much larger than 4.

Handling Memory Accesses, Including Dynamic Memory Disambiguation and Speculative Loads Memory accesses can be handled with two special types of techniques which increase parallelism. The IS transformation unit can take advantage of these two techniques using the following:

1. The execute unit can perform dynamic memory disambiguation by squashing dependent instructions and re-executing them in case of a memory access conflict. If this capability is supported by the execute unit, then the dependency information for ambiguous memory references should not be used to restrict the scheduling algorithm in the IS transformation unit. Instead, the ambiguous dependencies can be passed to the execute unit as part of the transformed ISA code in a data structure such as a dependency vector or dependency distance (described later in this document). Alternatively, a speculative read and read check instruction pair can be substituted for each ambiguous memory read (described later).

1. Speculative loads can be executed early if effects can be deferred until the original point in the instruction stream. This reduces the performance impact of delays in processing loads such as cache miss delays.

In speculative loading, the transformed code will contain two instructions for each original ISA load. The first instruction is a speculative load which can be scheduled early. The second instruction is a load activation instruction which "activates" the speculative load and its effects, including possible side-effects or exceptions such as a page miss fault. The speculative load is not dependent or anti-dependent on nearby previous instructions except memory writes if the load result can be written into an free (empty) temporary register which is not part of the original ISA definition. The second activating instruction is dependent on the completion of the first instruction and may cause register use dependencies for later instructions which reference that register.

The IS transformation unit can first insert the two instructions into the code block as adjacent instructions. The scheduling algorithm will promote (boost) the speculative load to an earlier point in the schedule as far as useful and practical.

This process is performed by the speculative load conversion means 304 (FIG. F-3) in the instruction stream transformation unit 102.

The combination of these two techniques should be fairly powerful and allow significantly more parallel code schedules, thus increasing processor performance.

Static Instruction Scheduling

Static instruction scheduling is performed via the following two steps:

1. Determine the dependencies between instructions. This is conceptually represented as a directed acyclic graph but in physical memory can be represented in a variety of ways. In our example design, the dependency representation is stored in the local memory of the IS transformation unit.
2. Use a scheduling algorithm such as list scheduling or greedy scheduling to group instructions into instruction groups. A sequence of instruction groups is the resulting schedule.

The dependency information can be generated more quickly using parallel dependency detector(s). A parallel dependency detector circuit 312 (FIG. F-3) is defined as a circuit that can compare more than two instructions or two operands within one cycle and determine dependencies. For example, a parallel dependency detector could compare one instruction against N prior instructions. Another kind of parallel dependency detector could take several instructions at once, compare them against each other as well as against a data structure maintaining the last possible write to all register/condition code/memory operands. Using such parallel dependency detectors, the IS transformation unit 102 can generate dependency information for at least one and optionally several instructions per cycle.

Scheduling is done using the dependency information, resource unit numbers, and optionally the normal latency of each operation, when known. A variety of fairly good scheduling algorithms such as list scheduling exist and can be implemented in the IS transformation unit. Parallel hardware can allow scheduling to process more than one instruction per cycle on average.

Scheduling Algorithm Details

Instruction Scheduling Windows

Instructions are scheduled within an instruction window whose size is implementation dependent. The instruction window size is either limited by the size of the hyperblock or limited by the implementation limits on number of instructions that the IS transformation unit can handle.

Code blocks longer than the instruction window can be scheduled via a method of adjacent or overlapping instruction windows. Using adjacent instruction windows means that the IS transformation unit will divide the code block into disjoint sub-blocks which are adjacent to each other and schedule each separately. For example, if the code block is 327 instructions long and the instruction window is 100 instructions, the sub-blocks can be instructions 1–100, 101–200, 201–300, and 301–327.

Using overlapping instruction windows means that the consecutive instruction windows overlap.

For example, suppose that the instruction window is 100 instructions, and the code block is 500 instructions long. The first window could be instructions 1 to 100; the second window could be instructions 81 to 180; the third window could be 161 to 260; and so on. The IS transformation unit processes the first window by scheduling instructions 1 to 80 based on the dependencies between instructions 1 to 100. Next, the IS transformation unit schedules instructions 81 to 160 based on dependencies between instructions 81 to 180 plus dependencies carried over from the end of the first window. The use of overlapping windows is preferred over adjacent code windows because the scheduling is improved near the window boundaries.

Dependency Matrices—Forward and Backward (Transposed).

We have created a representation of dependencies between instructions using a matrix representation called a dependency matrix. This is created and handled within the IS transformation unit 102 by the dependency matrix means 300 (FIG. F-3). We use our dependency matrix representation rather than a directed acyclic graph (DAG) representation because the matrix allows fast parallel computations on entire rows and columns at once. This increased speed allows the scheduling to be done in a much smaller number of cycles than using a DAG representation.

The dependency matrix representation conceptually represents the same information as a dependency DAG. The non-zero numbers in the dependency matrix indicate dependencies between instructions. The value indicates the number of cycles of latency to allow between the issue of an instruction and the issue of instructions dependent upon it.

A forward dependency matrix FDM is a square matrix that has one column and one row per instruction. If the k-th instruction is dependent upon the j-th instruction, this is indicated by a non-zero entry in the k-th row, j-th column (FDM(k,j)). The value of the entry is equal to the number of cycles of latency between starting the j-th instruction and starting the k-th instruction due to this dependency. A zero in a matrix position indicates no dependency is represented.

In a forward dependency matrix, each column j has non-zero entries which show which instructions are dependent upon the j-th instruction (forward dependencies).

See FIG. F-4

FIG. F-4 shows an example of a forward dependency matrix of size 5×5. This matrix is small, so that it can be a simple example (most dependency matrix implementations will be substantially larger). In this example, instruction #2 has a 1-cycle delay dependency on instruction #1. Also, instruction #4 has a 3-cycle delay dependency on instruction #2.

A backward dependency matrix BDM is the transpose of the forward dependency matrix FDM, i.e. for every j,k: FDM(j,k)=BDM(k,j). If the k-th instruction is dependent upon the j-th instruction, this is indicated by a non-zero entry in the j-th row, k-th column (BDM(j,k)). Again, the value of the entry is equal to the number of cycles of latency in this dependency. A zero in a matrix position indicates no dependency is represented.

When the backward dependency matrix is examined, each column j has non-zero entries which show the dependencies of the j-th instruction on previous instructions (backward dependencies).

In addition, the dependency matrices should be extended with one additional row/column to account for potential long-range dependencies which are present between instructions in the current instruction window and instructions prior to the current instruction window. This feature allows scheduling of long code blocks using multiple windows and also allows scheduling of the first window in a code block taking into account dependencies to prior instructions. These dependencies are represented by allocating a dependency entry between each instruction and the beginning of the instruction window. This dependency entry is a cycle number K which is the maximum of all of X's dependencies to instructions prior to the window boundary. This means that X should not be scheduled until at least K cycles into the current window. For example, if there is a dependency between instruction X and instruction Y which is L cycles long, and Y is scheduled 2 cycles prior to the beginning of the current window, then the dependency should be noted as a dependency of (L-2) cycles to the beginning of the window.

Building Dependency Matrices from an Instruction Block Using Operand Mapping Tables The IS transformation unit will make a first scheduling pass over an instruction window in chunks of up to N instructions, where N is an implementation dependent number, in order to build the dependency matrices.

Operand mapping tables are used to note possible writes to operands (registers, flags, etc.) by instructions prior to the current chunk of instructions. These mapping tables are used as the IS transformation unit 102 begins its first step of building the dependency matrices. These tables are built by the operand mapping table means 302 (FIG. F-3) within the IS transformation unit 102.

The mapping tables contain an entry for each operand register. It may be useful to make each mapping table entry be a vector of the same size as the instruction window to allow flexible denotation of several possible previous dependencies. This situation occurs when the previous instructions which write the register are predicated.

In this case, the operand mapping table is a matrix of P operands and W instructions (window size). Note that P may be equal to the number of physical registers including renaming rather than equal to the number of architectural registers. Each mapping table entry corresponding to operand i is a vector of length W. Each element of the mapping table MT[i,j] corresponding to operand i and instruction j contains a non-negative integer equal to

- 0 if there is no write of operand i by instruction j (i.e. no dependency), or if the write has been superseded by a write by a later instruction k (where k>j), or if instruction j has not yet been processed (i.e. the g-th instruction is being processed and g<j).
- k if instruction j will write operand i (assuming instruction j) after an estimated k execution cycles. k can just be an estimated wait time if the operation does not have a fixed delay (e.g. memory accesses) or can be reduced to less than the normal execution time if instruction j is predicated and unlikely to execute.

See FIG. F-5

FIG. F-5 shows a small example of an operand mapping table. The rows correspond to operands, and the columns correspond to instructions. The matrix in this example corresponds to four operands and five instructions. The example table indicates that operand #2 may be written by instruction #1 with an estimated execution delay of 1. Operand #3 may be written either by instruction #2 with a delay of 1 or instruction #4 with a delay of 3; this is an example where instruction #4 is a predicated instruction and hence does not cause the entry for instruction #2 to be zero. Operand #4 may be written by instruction #5 with a delay of 2.

The mapping table vectors are built incrementally as each chunk of instructions is processed. Multiple conditional or predicated writes may be present for a particular operand. An unconditional write to operand i by instruction j will make all previous entries in that vector equal to 0 (i.e. MT[i,k]=0 for all k<j).

In addition, other information such as predication of instructions can be maintained in the mapping table for quick indexed access by operand.

By using mapping tables, the size of parallel dependency detectors required is reduced. Parallel hardware is only used to detect dependencies between instructions within the chunk of instructions which are processed in parallel by the IS transformation unit.

The dependency matrix vector for instruction m can be built by first looking up the mapping table entries for all source operands of instruction m. The dependency matrix vector V is then calculated using a parallel vector unit which combines the mapping table entries into One vector as follows:

V[i]=max(T1[i], T2[i], T3[i], . . . where T1[i], T2[i], T3[i], . . . are the source operand mapping table entries.

The calculation of V must also include the dependencies between instructions within the chunk of instructions being processed in parallel. Thus, the outputs of the parallel dependency detectors can be fed into an additional input of the circuit implementing the max function.

Write-after-write hazards (also called anti-dependencies) for the destination operands of instruction m must also be taken into account if there is no register renaming. This adds some complexity to the above mapping table maintenance, but can be done by including all uses of the current value of each operand in the operand's mapping table vector. This typically can be handled by setting MT[i,j]=1 for an operand i and an instruction j which uses i as a source operand. Then the next instruction (or group of predicated instruction(s)) which writes operand i will be scheduled at least 1 cycle after the last use of operand i.

However, in this example, we prefer using register renaming to circumvent the problem of write-after-write hazards. Using register renaming, the write-after-write hazards need not cause scheduling dependencies. Preliminary static register renaming can be done as part of this first scheduling pass. This is performed by the register renaming means 306 (FIG. F-3). New statically-renamed registers can be tentatively allocated during this initial scheduling pass, and the corresponding mapping table entries filled in. The use of statically-renamed registers and their corresponding architectural registers can be noted in the data structures managed by the IS transformation unit. Otherwise, dynamic register renaming can be performed by the execute unit, but this adds some work to the execute unit.

Forward and Backward Iterative Traversals Using Dependency Matrices

A basic forward iterative traversal of a forward dependency matrix is equivalent to a breadth-first traversal of the dependency DAG, also known as a greedy traversal. This gives the depth of each instruction in the dependency DAG which is the minimum cycle number in which an instruction can be scheduled due to dependencies and instruction latencies. The effects of resource limitations are not included in this depth calculation.

This forward traversal can be done as a left-to-right column sweep of the forward dependency matrix. During the sweep, a vector M maintains the tentative minimum cycle number of each instruction based on instructions scheduled already. Pseudo-code is as follows:

the IS transformation unit, as opposed to one cycle of the instruction stream schedule being generated.

In practice, the inner loop for j can be executed using vector operations on entire columns of the matrix at once, so this loop can be completed at a rate of one instruction per IS transformation cycle. A rate of better than one instruction per IS transformation cycle is possible if some additional hardware is used to process two or more adjacent instructions in one IS transformation cycle whenever such instructions are not dependent among themselves.

---

Methods for Increasing Instruction-Level Parallelism

---

List-Scheduling Algorithm Step 3 (pseudo-code):
M = vector of 0's
CC = vector of false
PS = vector of false
R = vector of false
C = vector of 0's
S = vector of false
NumScheduled = 0
/* Get initial ready list from the instructions which can be scheduled in cycle 0. */
for j = 1 to NumInstructions
    if BFM[j] = 0, then set R[j] = true, PS[j] = true, C[j] = 0, S[j] = true
endfor
CycleNum = 0
repeat
    /* Pack instructions into instruction tuple for CycleNum from ready list R
    in order of priority in vector P until no more instructions can be packed
    from the current cycle based on resource limitations. */
    for all j where R[j] = true, select j in order of priority P[j]
        if instruction j can be scheduled in the current instruction tuple
        including effects of resource limitations, then
            NumScheduled = NumScheduled + 1
            CC[j] = true
            S[j] = true
            C[j] = CycleNum
            R[j] = false
        endif
    endfor
    for all j where CC[j] = true    /* update M vector */
        for k = 1 to NumInstructions
            if (FDM[j,k] <> 0 and M[k] < FDM[j,k] + CycleNum), then
                M[k] = FDM[j,k] + CycleNum
        endfor
    endfor
    for all j where S[j] = false    /* update PS vector */
        /* if all direct predecessors of j have been scheduled, set PS[j] */
        if S[k] = true for all k where FDM[j,k] <> 0, then PS[j] = true
    endfor
    CycleNum = CycleNum + 1
    CC = vector of 0's
    for all j where S[j] = false    /* update R vector (ready list) */
        if (PS[j] = true and CycleNum >= M[j]), then R[j] = true
    endfor
until all instructions are scheduled (i.e. NumScheduled == NumInstructions).
    R = bit-wise OR of R and NR /* update R vector with new ready instructions */
until all instructions are scheduled (i.e. NumScheduled == NumInstructions).

---

As the k-th instruction is scheduled, its minimum cycle number is added to each non-zero j-th element in the k-th column FDM[j,k]. The resulting vector is used to update vector M. For each value greater than the corresponding current cycle stored in vector M, the vector element in M is updated.

At the end of this loop, vector M contains the minimum cycle number for each instruction based solely on instruction dependencies and latencies without considering limited execution resources.

Throughput Analysis

To avoid confusion, when we analyze throughput, we use the term "IS transformation cycle" to indicate one cycle of List Scheduling Once the dependency matrices have been constructed, the transformed code can be placed into a schedule using a scheduling algorithm. This algorithm is executed in hardware by the code block scheduling means 316 (FIG. F-3).

List scheduling has been proposed as an effective heuristic for scheduling under resource limitations. We can implement list scheduling in hardware using the following steps:

1. Do a basic forward iterative traversal to calculate the minimum cycle number or depth of each instruction from the start of this block. The method for performing this step is described previously.

2. Propagate the depth of each leaf instruction to all its predecessors to calculate each instruction's priority as defined by the depth of its deepest child.
3. Perform a second forward iterative traversal, where the scheduling priorities are used in conjunction with a ready list (the list of instructions that are ready to be scheduled because all dependencies have been resolved). This is a cycle-by-cycle traversal. All instructions on the ready list which have no outstanding dependencies are scheduled according to their priority and resource limitations. When no more instructions can be scheduled in this cycle from the ready list, the cycle is advanced and the dependency matrix is traversed once. This creates a new ready list which is scheduled.

The pseudo-code for implementing step 3 using our dependency matrixes and vector operations is as follows:

Vector Definitions for Step 3 of the List Scheduling Algorithm

P[j]=priority of the j-th instruction=depth of deepest child of j-th instruction as described above PS[j]=flag which is true when all predecessors of j-th instruction have been scheduled R[j]=flag which is true when j-th instruction is part of the ready list as described in the list scheduling algorithm.

C[j]=cycle number in which j-th instruction is scheduled. This is complete for all j at the completion of the algorithm. During execution of the algorithm, C[j] may contain partial (not final) results.

BFM[j]=minimum cycle number as calculated using the breadth-first forward traversal described earlier in step 1

M[j]=minimum cycle number for each instruction j as calculated in this step (step 3) of the list-scheduling algorithm CC[j]=flag which is true if j-th instruction is scheduled in current cycle S[j] flag which is true if j-th instruction has been scheduled The output of the following algorithm is a set of instruction tuples, one for each cycle, and a vector C which contains the cycle number for each instruction counting from cycle 0 for the first instruction tuple of the code block.

```
M = vector of 0's
for k = 1 to NumInstructions
    for j = k+1 to NumInstructions
        Cycle = FDM[j,k] + M[k]
        if Cycle > M[j], then M[j] = Cycle
    endfor
endfor
```

Throughput Analysis of Step 3

To implement this algorithm quickly requires vector hardware and some vector priority selection circuits and vector true/false detection units. By using vector operations, the inner loops can be completed in one IS transformation cycle. The vector priority and true/false detection units are used to find one instruction j to be processed per IS transformation cycle. Therefore, one instruction j in the "for all j" loops in the algorithm can be processed in each IS transformation cycle using parallel vector units to perform the operations involving matrix FDM and vectors M, PC, and NR. In addition, several small scalar units are required to update single entries in the CC, S, C, and R vectors. For version 2 of the step 3 code, this results in a throughput of scheduling one instruction per IS transformation cycle.

To go faster, a hardware circuit can be used to select several instructions per cycle to be processed in the "for all j" loops. If we find several instructions that among themselves are independent, then all can potentially be scheduled in one IS transformation cycle, subject to resource limitations both in the execute unit (i.e. Can the instructions all fit into one instruction tuple given execute unit limitations?) and IS transformation unit (i.e. the limits on what can be processed in one cycle in the IS transformation unit). This requires multi-porting the data tables for vectors CC, S, C, R, PC, NR and matrix FDM. Additional vector/scalar units or super-pipelining of the vector/scalar units is needed.

Processing Dynamic Memory Disambiguation

As indicated earlier, dynamic memory disambiguation can be accomplished by not allowing ambiguous memory dependencies to constrain scheduling. This is done by not putting these dependencies into the dependency matrices prior to scheduling. We have two methods of handling dynamic memory disambiguation; either may be used (no preference).

Method 1 of handling ambiguous memory dependencies is as follows. The ambiguous memory dependencies are placed as dependency vectors into a separate ambiguous dependency matrix (handled by an ambiguous memory dependency matrix means 308 in FIG. F-3). This ambiguous dependency matrix is similar to the dependency matrix described earlier, except that ambiguous dependency matrix is only used to represent possibly ambiguous memory reference dependencies. After the code has been scheduled, the matrix is reordered according to the new code schedule so that rows and column entries in the dependency matrix are in the same order as the instructions in the transformed code schedule. This is done by first reordering the rows and then re-ordering the columns (or vice versa). Any ambiguous memory reads which are promoted to prior to ambiguous memory writes in the new code schedule can now be easily determined from this matrix as an earlier scheduled instruction depending on a later instruction. The corresponding ambiguous memory read instructions can then be tagged in the transformed instruction stream with a dependency vector of future memory writes. If any of those writes conflict, then the execute unit must squash and re-execute the instructions starting from the ambiguous memory read or the first instruction dependent upon it.

If the execute unit design does not need a tag indicating which particular instructions are ambiguous memory writes, then the tag can be converted to a dependency distance. Any writes within the dependency distance after the read will be compared to the read for conflicts.

Method 1 allows dynamic memory disambiguation within a code block but does not handle dynamic memory disambiguation between code blocks. Either that is not supported or must be supported through a different mechanism.

Method 2 is as follows. All ambiguous memory reads are split into two instructions, a speculative read and a read check. The speculative read is not dependent on the ambiguous writes. This speculative read is scheduled without the dependencies and therefore can be promoted earlier in the code. The read check is a second read of the same memory location and is scheduled after the last ambiguous write assuming the data dependencies exist and is therefore scheduled conservatively. The read check follows the speculative read and therefore will usually be able to get the data from 1st level data cache or a load buffer or else possibly from a store buffer if an intervening write has occurred; in either case, the second read usually has low latency. The speculative read and the read check refer to the same source and destination IDs and if necessary to another uniquely-generated ID, so that they can be paired together at run-time.

Instructions dependent on the original read are made dependent on the speculative read but not on the read check. This allows dependent instructions to be promoted along with the speculative read.

If the read check has a different value than the speculative read, then all instructions must be squashed and re-executed starting from the speculative read or first instruction dependent upon it. The value of the speculative read can be maintained in a load buffer or in a shadow register until this comparison occurs. A prior-art method of determining memory conflicts called a memory conflict buffer can alternatively be used instead of performing a second read to do the read check.

Method 2 allows dynamic memory disambiguation within a code block. It can potentially also allow dynamic memory disambiguation between code blocks if the speculative read can be promoted between blocks through the scheduling algorithm. However, the example IS transformation code scheduler which we have described does not do this type of inter-block promotion.

Throughput Analysis of IS Transformation Unit

The IS transformation process consists of several steps as explained earlier. Our example scheduling hardware can process one to a few instructions per cycle as explained above. The other steps of CISC-to-RISC translation, if-conversion, and use of speculative memory loads can also be done at a rate of several instructions per cycle. The steps of the IS transformation process can be pipelined, so that the overall throughput of the IS transformation unit is one to a few instructions per cycle.

To further increase performance, the IS transformation unit can process several code blocks independently in parallel. This requires additional parallel hardware resources.

Static, Dynamic, and Semi-Dynamic Scheduling

The performance benefit of dynamic scheduling over a good static schedule may be minimal according to a study by Rudd and Flynn if the dynamic scheduling is done in a small run-time window as in current out-of-order superscalar processors. Therefore, it may be better to substantially simplify the execute unit by using static scheduling and rely on the IS transformation unit to deliver a good code schedule. The IS transformation unit is specific to each processor design, so it can properly account for execution resource numbers and latencies to create a good code schedule. The resulting simplifications to the execute unit may enable a higher clock frequency, thus increasing performance.

Given a good code schedule, the remaining benefit of dynamic scheduling is the ability to schedule around instructions which have varying delays, primarily memory load instructions which may cause cache misses. However, the performance impact of cache miss delays is reduced if the processor uses the speculative load technique described earlier. Therefore, the remaining performance gain deliverable via dynamic scheduling in the execute unit is reduced.

Using Scheduling with an Execute Unit Which does Dynamic Instruction Scheduling

If the execute unit does perform dynamic instruction scheduling, the static instruction schedule can just be a guideline for actual execution.

It is still very useful to perform the static scheduling algorithm in the IS transformation unit since it can operate in a fairly large window. Scheduling is particularly useful for promoting (boosting) instructions such as speculative loads over a large number of instructions to much earlier in the block of code. Promotion over a large number of instructions is more difficult to do in the execute unit, which tends to operate on a first-fetched, first-issued basis excepting dependencies which stall dependent instructions. Therefore, the earliest that the instruction can issue is dependent on its order in the instruction stream even in execute units with dynamic scheduling.

Placing Dependency Information into the Transformed Instruction Stream for Both Dynamic and Static Scheduling Optionally, some or all of the dependency information can be maintained in the instruction stream cache so that the dynamic execution can use this dependency information without having to re-detect all the dependencies dynamically. A dependency representation can be passed as a data structure like the row/column vectors of the dependency matrix used in static scheduling or its equivalent as a sparse vector compressed representation. For dynamic scheduling, we can optionally simplify the data dependency vector structure to a single yes/no bit per dependency rather than cycle numbers. Because the dynamic scheduling hardware will keep track of when instructions complete execution, the cycle numbers are not necessarily needed, although they some dynamic scheduling hardware could certainly be designed to take advantage of that information.

It may be easier to have consecutive entries in the dependency vectors correspond to consecutive instructions in the transformed instruction stream rather than the original instruction stream or a translated version (e.g. CISC to RISC) of the original instruction stream. The IS transformation unit can provide this by reordering the entries of the dependency matrix according to the order of the transformed instructions.

The passing of this dependency vector information also helps substantially reduce instruction inter-lock checking for both static and dynamic execution. However, the dependency vectors take a very substantial amount of storage space unless a compressed sparse vector representation is used or a smaller window is used. The window size of the dependency vectors inserted into the transformed code need not be the same size as the window used during code scheduling by the IS transformation unit. The window size can potentially be substantially smaller for compactness. This requires an extra IS transformation step after code scheduling to generate the smaller dependency vectors for the IS stream.

To further save storage, several instructions could be combined into a mini-tuple which is dynamically scheduled as an atomic group in the same cycle. The dependency vectors of those several instructions can then be treated as vectors corresponding to one combined instruction, so the dependency vectors can be combined into one vector via the maximum function described earlier.

For static execution where instruction tuples are executed and completed in-order, the dependency vectors can be compressed in up to two ways. First, there is only a single dependency vector for each tuple since the tuple issues as a unit. Second, the vectors can have one entry to indicate dependency on each preceding tuple rather one entry for each preceding instruction since each preceding tuple is issued and completed as an unit. There might be a small performance loss with this second compression since sometimes the current tuple will stall waiting for instructions in preceding tuples to execute when in fact the current tuple is not dependent on those instructions but is instead dependent on other instructions in the preceding tuples. These compression techniques save cache space and make run-time inter-locking substantially simpler.

Semi-Dynamic Instruction Code Re-writing and Scheduling

The IS transformation unit can revise code that has been previously scheduled and placed in the instruction stream cache. The transformation unit can either be designed to start again using the original ISA code plus newly-acquired run-time information or to start with the transformed ISA code and make changes. This ability allows the code to be adapted to program behavior at run-time. Since this process most likely will occur less often than individual executions of a code block, the process is termed semi-dynamic. This type of scheduling is different than the dynamic run-time scheduling in a small window and may provide noticeable performance improvement.

To perform this semi-dynamic scheduling, relevant notes about the run-time behavior of code blocks should be recorded while the program is executing. This information is passed to our instruction stream transformation method, which will then make appropriate adjustments when rescheduling the code blocks.

See FIG. F-6

FIG. F-6 shows an example implementation where history information is recorded by the execute unit 100 in various tables for use by the IS transformation unit 102. The IS transformation unit 102 can then use this information to perform semi-dynamic scheduling.

One useful type of information available at run-time is branch history information, which may already be maintained for purposes of branch prediction in a branch history table or other structure. This branch history information can be used to substantially optimize decisions about whether or not to use predication for each particular condition. Branch history tables are prior-art, but our usage of the branch history for rescheduling the code is different than in prior art known to us.

In addition to a branch history table, we have created several new types of history tables that can optionally be included in our micro-architecture. The benefit of using these tables should be evaluated by the designer dependent on the particular design goals and set of programs or benchmarks being run.

First, we can define a predicate history table 600 that can be maintained for recently-executed predicates to aid in the decision process for predication. The predicate history table 600 contains entries indexed by instruction addresses of predicate-defining instructions. For example, each predicate's table entry can contain the recent history of whether that predicate was true or not as a bit vector with one bit per recent execution.

In addition, predicate histories allow the code scheduler (i.e. IS transformation unit) to place varying amounts of importance on dependencies involving predicated instructions. For example, if a predicated instruction X is usually squashed (i.e. X's predicate is usually false), then the scheduler could decide to assign the minimum dependency length (1 cycle) to dependencies between X and dependent instructions even if X typically takes several cycles to execute (e.g. a memory access). This allows the processor to speculatively execute the dependent instructions earlier (by assuming X is squashed); the transformed code can optionally indicate this assumption explicitly. If X's predicate is true, then the speculative execution is squashed and the dependent instructions are re-executed, but usually, the speculative execution is valid.

Another type of run-time information useful for semi-dynamic rescheduling is data access miss/hit histories. The processor can maintain a data hit/miss history table 602 of recently-executed memory access instructions, indexed by instruction address. This table is similar to branch or predicate history tables in capturing only a fixed number of recently used memory access instructions. Each memory instruction's table entry indicates whether recent accesses were misses or hits in the cache hierarchy. For example, if there are 3 levels of cache plus main memory, the table can use 2 bits per access to indicate whether the data came from 1st, 2nd, or 3rd level cache or main memory. By maintaining a history of recent accesses, we can determine whether or not to schedule that memory instruction assuming that the cache will hit in the 1st, 2nd, or 3rd level or main memory. If the data is coming from 1st level cache most of the time, we can schedule the code more packed than if it is coming from 3rd level cache.

Another type of history table is an ambiguous memory conflict history table 604. This records whether previous executions of promoted ambiguous read references cause memory conflicts or not. The resulting data is then used in semi-dynamic rescheduling.

If value prediction is used to improve instruction-level parallelism and performance, then the processor can maintain a value prediction history table 606 of the success or failure of the value predictions. This can be used to determine whether or not each value prediction point should be included in the revised code (i.e. value prediction is a performance win at that point). Also, the code scheduling can be done taking into account the success probability of each value predictor.

Some embodiments may use additional tables 608 to keep track of run-time information useful for semi-dynamic scheduling.

The dynamic run-time history information is used by the IS transformation unit 102 to make predication decisions and to modify the dependency matrices described earlier with new dependency numbers. Once those changes have been made, the code can be rescheduled using the same algorithm as before.

The resulting transformed code block is written into the instruction stream cache hierarchy, replacing the previous version of the code block. This replacement must be performed in a way which does not interfere with the previous version of the code block in the middle of an execution run. The new version of the code block must be entered starting from the top of the block on the next branch or jump to that address. The previous version of the code block must be executed until then.

Details of Execute Unit and Execution Process Dynamically Switching Between Two Types of Instruction Streams and Dynamically Executing Consecutive Code Blocks Register Renaming The execute unit is capable of executing both original and transformed ISA code blocks and can switch dynamically between the two types of code during execution. A set of common registers and other state information is maintained when switching between the two types of code.

The process of executing original ISA code is likely to include run-time, dynamic register renaming. There are several known methods of implementing dynamic register renaming. Basically, for each renamed register, the renaming hardware must maintain an association between the actual physical register and the logical register being renamed. This can be done with pointers, index tables, re-order buffers, or other techniques. The renaming hardware must also track which physical registers are currently free and therefore available for renaming assignment.

When the execute unit jumps from an original ISA code block to a transformed ISA code block via a hit in the instruction stream cache, the transformed ISA code block will refer to logical registers. The same kind of renaming hardware used for original ISA code will also work to properly resolve references to logical registers in transformed ISA code.

In addition, the transformed ISA code can optionally incorporate static register renaming done by the IS transformation unit. The following description details the process of supporting static register renaming in transformed ISA code.

A statically renamed register would be indicated in register writes in the transformed ISA code via a dual register index: an original logical register number and a renamed physical register number. The physical register numbers for renaming are selected by the IS transformation unit at the time of code block transformation.

Read references in the transformed ISA code may directly indicate a physical register number or may refer only to a logical register number. A logical register number must be processed through the logical-to-physical register renaming hardware. A physical register number can be processed without serially performing this renaming step. By using physical register numbers where possible, the transformed ISA code can be processed in a very parallel fashion without requiring a large load on the register renaming hardware.

Although it is not necessary to serially perform the renaming step for direct references to physical register numbers, the register renaming hardware must still update the logical-to-physical mappings in parallel whenever a register is written.

Since some physical registers are used by the dynamic renaming hardware, it may be advantageous to designate separate groups of physical registers which are used for static renaming and dynamic renaming. This allows the static renaming process to allocate its own set of physical registers without interfering with the process of dynamic renaming.

To summarize, here are points about register renaming:
Original ISA code uses logical register numbers which are renamed dynamically.
Transformed ISA code also uses logical register numbers for reads of registers which have values prior to entering the transformed ISA code block.
Register writes within transformed ISA code can optionally include a physical register number for static renaming.
Register reads of values created within transformed ISA code can optionally use a physical register number for static renaming.
Every register write will update the logical-to-physical register mapping in the renaming hardware.

When jumping from an original ISA code block to a transformed ISA code block or vice versa, the logical registers contain the primary state information shared between the code blocks.

When jumping from a transformed ISA code block to another transformed ISA code block, the logical registers also contain the primary state information shared between the code blocks. The static register renaming is useful while executing each transformed ISA code block but is probably not useful for passing values between consecutive transformed ISA code blocks because the static renaming is performed on each transformed ISA code block separately.

Design Option: The processor implementation can optionally alternate between two sets of physical registers for static renaming when executing transformed ISA code blocks in series. The set of physical registers is alternated at the start of each execution of a transformed ISA code block. This may provide performance enhancement in some cases by allowing the next transformed ISA code block to immediately begin to use statically renamed registers without waiting for the previous transformed ISA code block to finish using the same registers (eliminating anti-dependencies in the usage of the static renaming registers). The use of this option depends on the design situation; the designer should examine the trade-off of how much faster the code can execute in cycles vs. the added overhead in register file access speed and chip area for maintaining two sets of registers.

(Note: The above design option is newly invented after the provisional patent application was filed and hence was not discussed in the provisional patent application. This design option is not necessary for the invention to function and is strictly an optional add-on. No claims have been made to specifically claim this design option.)

Supporting Precise Interrupts

An original ISA architecture and implementation which supports precise interrupts means that each original ISA instruction prior to an instruction causing exception shall be executed in its entirety (atomically) and each original instruction after the instruction causing exception shall not appear to be executed at all. This is a requirement in some ISA definitions that needs to be supported by the transformed ISA code.

Suppose the translation of one original ISA instruction can create an instruction group of more than one transformed ISA instructions. Supporting precise interrupts requires that this group of transformed ISA instructions atomically commit their combined state. Furthermore, this group must be committed at the right time to preserve the appearance of in-order execution of original ISA instructions. Thus, this group must be committed after the group corresponding to the previous original ISA instruction and before the group corresponding to the next original ISA instruction.

Several methods are available for supporting precise interrupts. Two example methods are presented here detailing how support for precise interrupts can be handled in a transformed code block. Any of several methods can be used for precise interrupts; we have no preferred or best mode in general.

Method #1 for Precise Interrupts: Using Last Instruction in Group to Commit State In addition to static renaming, the separate group of physical registers allocated for transformed ISA code can also be used to hold temporary values which are not yet committed to a logical register. This can be used to support precise interrupts. For example, a speculative load can place the value into a physical register, and the corresponding load activation can commit the value to a logical register.

In general, the processor may place temporary values created by an instruction group into physical registers that do not correspond to logical registers. The final instruction of the group will commit the values to logical registers. If an exception condition is detected requiring nullification, the logical registers will not be updated if the final instruction of the group is nullified. This concept must also be extended so that the final instruction also controls all other state updates, such as updating condition codes or memory accesses.

Method #2 for Precise Interrupts: Using Instruction Sequence Numbers

Another method to achieve precise interrupts is to assign instruction sequence numbers to each original ISA instruction starting from the beginning of the code block. The first instruction may have number 0, the second instruction may have number 1, and so on. The transformed ISA instructions will each have the corresponding original ISA instruction sequence number. It is then necessary for the re-ordering hardware to commit all of the instructions corresponding to each instruction group atomically and in-order according to the instruction numbering. The initial instruction of each group will determine the actual instruction numbers which are being executed since conditional branches may cause some numbers to be skipped (i.e. the numbers will increase monotonically but will not necessarily be sequential integers.)

Also, several transformed ISA code blocks may be executed in sequence or the same code block may be executed several times due to branching. Therefore, the sequence numbers from different code blocks or sequential executions of the same block must be kept conceptually separate by the re-ordering hardware via sequential numbering of code blocks being executed or other sequential numbering mechanism.

External Interrupts

External interrupts such as keyboard or disk interrupts can be handled at a convenient point in the code; the interrupt need not occur precisely at the current instruction when the interrupt line signals. When the external interrupt is taken, the processor should finish committing all instructions that can be committed. The remaining instructions in process are squashed. The interrupt is then taken (i.e. branch to interrupt code). After the interrupt routine returns, execution begins after the last committed instruction.

Efficient Handling of Dependency Information and Instruction Inter-Locks

In the execute unit, the source operands of instructions being decoded must be checked against destination operands of instructions in process.

For transformed ISA code, the process is simplified because the instructions within one parallel instruction tuple are known to be independent of each other. Therefore, the newly-decoded instructions do not need to be checked against each other and only need to be checked against other instructions already in process.

If the dependency vector information is included in the transformed ISA code (as described in earlier), then dependency checking may be minimal within a transformed code block. However, we still need inter-lock checking when crossing code block boundaries unless very conservative run-time scheduling is done at the boundaries. A particular code block such as a sub-routine may be entered from a number of different prior instruction streams, so the execute unit must be able to do inter-lock checking at least at these code block boundaries.

For original ISA code, incoming adjacent instructions might be dependent on each other and need to be checked against each other.

Associative comparisons of operand fields can be avoided by using a mapping table to map logical registers to either physical registers or reorder buffer entries for instructions which will write to those registers. The mapping table still needs to be multi-ported so that All source operands of incoming instructions can be mapped, and Mappings for destination operands can be updated after execution.

The number of ports increases as the parallelism width of the processor design increases.

We can simplify the mapping table to only map to physical registers if we only allow one outstanding write to a physical register and use a ready bit for the physical register to indicate whether the result is available yet. A second write to the same logical register will always be renamed to a different physical register at decode time. Each source operand is mapped through the table, and the ready bit of the corresponding physical register is examined to see if the operand is available.

Furthermore, if we add fields in the reorder buffer entry or the physical register to point to instructions waiting for this ready bit, we may be able to dispatch more instructions without having to do associative comparisons between newly available operand fields (on bypass busses) and waiting instructions.

By using a physical cross-matrix of lines corresponding to waiting instructions and physical register ready bits, we can set a line corresponding to activating a waiting instruction when all the source physical registers for that instruction are ready. The implementation is a cross-matrix of lines with control transistors controlled by RAM bits; RAM bits are set according to what physical registers are required by each instruction. The actual operands still have to fetched from the register file or bypass busses; in the latter case, associative comparison may still be necessary. Splitting the register file into multiple banks may help with multi-porting and also help reduce the hardware cost of many functional units accessing bypassed operands.

More Remarks on use of Dependency Notations in the Transformed ISA Code

It would be beneficial if each instruction in the transformed code could point directly to the prior instruction(s) which it depends upon. This would allow the execute unit to stall instructions waiting for preceding instructions to complete without requiring the execute unit to do any comparisons of operand fields.

In practice, some instruction operand uses may depend on one of several previous instructions depending on conditional branches or predication. For example, suppose the if-then and if-else branches of a conditional statement both assign a value to the same register. Then the subsequent use of this register value will depend on one of the two branches of code and will therefore be dependent on one of two preceding instructions. This situation or its corresponding predicate version can be handled using a dependency vector, rather than a pointer for a single dependency.

Another example is a subroutine which uses a register value from the calling routine. Since this subroutine may be called from N different calling routines, the register use is dependent on one of N possible previous instructions. In general, an instruction can theoretically depend on any number of prior possible instructions due to branching or subroutine calls. This makes representation and use of direct dependency information more difficult. It appears that this situation cannot always be handled using either dependency vectors or pointers and must sometimes be handled by run-time inter-lock hardware (or by conservative scheduling). In our example design, the transformed code is divided into code blocks, and branches or subroutine calls between code blocks may require some run-time inter-lock hardware (or conservative scheduling).

Using Dependency Pointers Rather than Dependency Vectors

If we do decide to use dependency pointers rather than dependency vectors, the IS transformation unit optionally place a direct dependency pointer in the transformed code whenever there is only one possible preceding instruction for a particular operand use in an instruction. In this case, the execute unit is not required to do any operand comparisons with currently pending instructions.

When there are several possibilities for preceding instructions or the preceding instruction might be outside of the current block of code being analyzed for transformation, the transformed code will indicate that normal dependency checking must be performed. The execute unit will then perform dependency checking against pending instructions or registers/storage locations which have pending writes (i.e. have a pending write flag).

Limiting the Amount of Run-Time Dependency Checking Per Cycle

By limiting the number of dependency checks that the execute unit can perform per cycle, a substantial savings can be achieved in hardware required for dependency checks. For example, suppose that the execute unit can theoretically decode and issue 20 transformed instructions per cycle, each with up to 2 source operands for a total of 40 source operands. In this example, the execute unit may limit the run-time dependency checking to 20 source operands, reducing the dependency checking hardware by a factor of 2. This will limit the maximum number of instructions issued to 10 if all instructions require two dependency checks. But in practice, some instructions will have predetermined direct dependency vectors or pointers, so on average, the limit due to dependency checks will be substantially more than 10 instructions/cycle. The IS transformation unit will know that it should create code schedules that do not require more than 20 dependency checks per cycle.

Some dependency checking hardware is required anyway to execute original ISA code at reasonable issue rates. It may be possible to use the same dependency checking hardware for executing both original and transformed ISA code.

Rescheduling—Lite Version

The techniques described can be used in a lite version for processor designs that do not require re-ordering of the instruction stream. In this case, the IS transformation unit does instruction translation (if necessary) followed by scheduling which does not perform re-ordering. The scheduling is simplified to the grouping of consecutive instructions into parallel execution tuples based on the hardware resources and latencies of the execute unit. Furthermore, because the instructions are not re-ordered, the execute unit does not require re-ordering hardware if the execute unit processes instruction tuples in order.

For example, this lite version is useful for processor designs where the original ISA already has modern techniques such as parallel tuples, speculative loads, and predication. Therefore, the design of a specific processor merely requires rescheduling of the instructions into tuples based on the hardware resources and latencies available.

Suppose that two processor designs using this technique exist: one processor has a 4-wide execute unit (i.e. can execute up to 4 instructions at once) and the other has a 16-wide execute unit. Using this technique, code compiled and scheduled for one processor will run fairly fast on the other processor as well. No software recompilation is required for fairly fast performance, so distribution and maintenance of multiple binaries is avoided.

Because no instruction re-ordering occurs, the IS transformation unit may be able to transform code blocks with multiple entry points as well as multiple exit points. This is more flexible than operating on hyper-blocks of code.

If no instruction translation is performed (i.e. original ISA=transformed ISA), then further simplifications may be possible:

The execute unit can be further simplified since it only needs to interpret one instruction set.

There is some possibility that a separate instruction stream cache is not necessary if the transformed code can be written back into the regular cache hierarchy. The transformed block can be substituted for the original block only if each instruction stays at the same memory address since other code may contain jumps or branches to intermediate points within the code block. The rescheduling can be indicated with instruction tuple bits in the cache line or other notations without moving instructions into new memory addresses. If instructions are moved to new memory addresses, a separate transformed copy of the code block must be kept, and the transformed copy is only used when entering from the top of the code block.

If no separate instruction stream cache is used, mechanisms are still needed to propagate transformed code blocks up through the cache hierarchy by invalidating or overwriting cached copies of original code blocks. Also, it may potentially be a problem to substitute a transformed code block for an original code block in the middle of executing the original code block; if so, mechanisms are needed to atomically update the caches with transformed code blocks.

The lite version also permits simpler processor designs for older CISC or RISC ISA's using statically-scheduled execute units. Scheduling is done by the IS transformation unit, and the execute unit processes instructions in order, thus eliminating much of the complexity associated with out-of-order issuing and multiple instruction issuing per cycle. Simplifying the execute unit may improve clock frequency and reduce the design complexity enough to permit a shorter time-to-market. Because this method does not use re-ordering, a good ordering of instructions by the compiler is needed for the IS transformation unit to find good parallelism. The resulting design will not have as much parallelism as a full version using our techniques (and will probably be slower in overall performance), but it will be a simpler design.

Ramifications

The techniques which we have developed have been presented in previous sections with example embodiments. The embodiments presented previously and the ramifications listed here are merely representative examples and are not exhaustive lists.

Some additional ramifications of our techniques include the following:

Our methods are independent of circuit fabrication technology and can therefore be used in CMOS, bipolar, GaAs, and other future circuit fabrication technologies.

Our techniques can be employed for a variety of original instruction set architectures (ISAs) including CISC, RISC, and EPIC instruction sets as well as a variety of transformed ISAs.

Our techniques are applicable to processors aimed at a wide range of design goals including high-performance, high-end, mid-range, low-end, low-cost, main-stream, embedded, application-specific, etc. Due to the rapidly advancing state of chip technology, techniques are often first introduced in higher-end, high-performance designs, but soon afterward such techniques will migrate to main-stream and low-end designs as well.

Our techniques can be implemented using software with fewer hardware units than described in our example embodiments, especially for simpler versions of IS transformation.

For example, suppose that the original ISA is an EPIC instruction set; the transformed ISA is the same EPIC instruction set; and the IS transformation is a "lite" version which just does re-packing of instructions into tuples without instruction reordering. In this case, the entire code transformation and scheduling could potentially be done in software, although this would most likely be much slower than a hardware-assisted implementation.

Some re-order buffer hardware is most likely needed in the execute unit if instruction re-ordering is performed during IS transformation, but the IS transformation process could still potentially be done in software with less or no specialized hardware.

We can use components of our techniques in processor designs without using the entire method of IS transformation. For example:

The vector or sparse vector representation of dependencies can be used in any ISA, not just transformed ISA's.

The idea of using a combination of dependency information in the instruction stream plus run-time detection of dependencies can be used in a processor design for any ISA, not just processors which perform IS transformation.

The proposed history tables for predicates, data hit/miss, value-prediction, and other run-time characteristics may be used in processor designs which do not use IS transformation. For example, a dynamically-scheduled, super-scalar processor may use a data hit/miss history table to help perform dynamic scheduling.

Our ideas for an execute unit which can switch smoothly between two different ISA's may be used in general for processor designs that must execute two or more ISA's. The ideas for managing dependency information and static vs. dynamic register renaming can be used separately from the idea of IS transformation.

Our ideas, data structures, and algorithms for IS transformation can be applied in a software compiler or translator. For example, a software compiler which is intended to recompile RISC binaries into new EPIC binaries may use these methods. A compiler which compiles a high-level language to executable binaries can also use our methods for IS transformation and code scheduling. Translator programs which translate binaries at load-time (e.g. DEC's FX!32 translator) can also use these methods.

DISCUSSION OF ALTERNATIVE EMBODIMENTS/BEST MODE

Our techniques can be applied in a wide range of processor designs, with differing design goals, instruction sets, and intended workloads. Many of the design choices which we have outlined introduce trade-offs between performance and other considerations such as cost, die size, or design complexity. Therefore, the design choices are often best made once the goals for a particular processor design have been defined. Without particular instruction sets, design goals (e.g. low cost, low power, or very high performance), and intended workloads (e.g. engineering, database, or personal productivity programs), it is difficult to state which design choices are most beneficial in general.

The design of any commercial microprocessor is a large project. A substantial amount of effort is spent by the micro-architectural design team to determine a range of reasonable micro-architectural possibilities. Extensive simulations and analysis are then performed to select a particular set of design options. The options which we have outlined largely fall into this class of choices to be made at design time.

As an example, we can state our preliminary preferences supposing that the design goal is to build a very high-performance processor which can execute a RISC instruction set. The goal allows a large die size and a substantial power budget (within air-cooled limits). This type of design is well-suited for a full implementation of our IS transformation techniques including:

An IS transformation unit which builds rescheduled hyper-blocks and supports predicate if-conversion, dynamic memory disambiguation, speculative loads, and static register renaming.

This transformation uses "presumed" hyper-blocks so that no compiler annotation is required and legacy binaries can be transformed for high-performance.

Transformed ISA which is highly parallel

Instruction stream cache

Execute unit which executes both the original RISC and the transformed ISA

The transformed ISA code is statically scheduled (assuming simulation data indicates that a dynamically-scheduled unit does not offer substantially more performance).

The RISC instructions are executed using a superscalar design.

History tables are maintained for predicates, data/hit miss, and ambiguous memory reads to support semi-dynamic and dynamic code scheduling.

The execute unit supports dynamic and static register renaming.

Semi-dynamic code scheduling using run-time information from the history tables to further optimize performance Method #2 for precise interrupts Dependency vectors in the transformed instruction stream to reduce the amount of run-time dependency checking required.

In a second example, suppose that the original ISA is an EPIC instruction set. Then two kinds of processor designs may be useful:

One approach is a "lite" version of our design (as explained earlier) which only does instruction packing into tuples without instruction re-ordering. This is a method enabling processors of different parallel widths to run the same code fast without having to provide separate binaries for each processor. The original and transformed ISA's are the same in this case.

A second approach is to use a full implementation of our design to perform scheduling including dynamic memory disambiguation and semi-dynamic scheduling considering run-time statistics. In this case, the design is similar to the RISC example above including history tables, semi-dynamic scheduling, and instruction re-ordering. The transformed ISA is different than the original ISA and contains additional dependency information.

Definitions

The following definitions are for the purposes of clarifying the claims made and do not introduce any additional description or operation of our invention.

1. An integrated circuit is a circuit manufactured as a monolithic unit. It is recognized that low-cost electronics result largely from being able to fabricate an entire unit of high complexity using a relatively small number of steps. At the time of this document, the most common fabrication techniques manufacture an integrated circuit as "a chip", i.e. a small planar piece of semiconductor patterned with circuit elements. However, an integrated circuit is not limited to this definition or to present-day fabrication techniques. Future fabrication techniques may be substantially different.
2. A circuit device is defined as follows:
a) An integrated circuit is a circuit device.
b) In addition, a combination containing more than one integrated circuit where the combination performs a useful function is a circuit device (e.g. a processor module or board containing a CPU and cache memory chips).
c) Examples of circuit devices are a CPU, graphics processor, signal processor, ASIC, communications processor, multimedia processor, and memory chip. Other circuit devices may combine several such functions on to one integrated circuit (e.g. a super-integrated chip combining CPU, graphics processor, and memory). These are merely examples and not a limiting or exhaustive list.
3. A processor device is defined as a circuit device that comprises means of executing a machine language that specifies programs. Examples include a central processing unit (CPU), microprocessor, application-specific processor, or graphics processor. This is a common industry term and does not necessarily include other components of a computer (RAM, graphics unit, I/O, etc.). The means of executing a machine language can be implemented on one integrated circuit, multiple integrated circuits, or a part of one integrated circuit that also contains additional functionality such as RAM, video, or I/O. In the latter case, above definitions are interpreted to mean that the entire integrated circuit is defined to be the processor device.

What is claimed is:

1. A processor device comprising
an instruction stream transformation unit that transforms code blocks of instructions from an original instruction set architecture to a transformed instruction set architecture,
a regular cache that stores instructions in said original instruction set architecture,
an instruction stream cache that stores instructions in said transformed instruction set architecture, and
an execute unit for executing instructions,
wherein said instruction stream transformation unit transforms said code blocks of instructions from said original instruction set architecture to said transformed instruction set architecture,
wherein said instruction stream cache stores said code blocks after transformation to said transformed instruction set architecture for possible future execution,
wherein said instruction stream cache comprises means of storing and later fetching a transformed code block that spans more than one cache line in said instruction stream cache,
wherein said instruction stream cache is addressed by some of said fetch requests from said execute unit and can potentially respond to some of said fetch requests for said code blocks after transformation without requiring cache hit information from said regular cache after said code blocks have already been transformed and stored into the instruction stream cache, and
whereby the execution of a program code by said processor device is accelerated by transforming portions of said program code at run-time into the transformed instruction set architecture for more efficient execution and caching the transformed code within the instruction stream cache for possible repeated execution without requiring repeated transformations.

2. A processor device as in claim 1 wherein
said execute unit can directly execute instructions in both said original instruction set architecture and said transformed instruction set architecture,
whereby the execute unit can execute code in said original instruction set architecture without having to first wait for said code to be transformed into said transformed instruction set architecture.

3. A processor device as in claim 2 wherein said execute unit is an in-order execute unit that retires instructions and commits their results in the same order as the instructions occur in the code.

4. A processor device as in claim 2 wherein said execute unit is a dynamic out-of-order execute unit that can retire instructions out of order compared to the order of the instructions in the code.

5. A processor device as in claim 1 further comprising a working memory connected to said instruction stream transformation unit for storing intermediate calculations during the process of transforming code from said original instruction set architecture into said transformed instruction set architecture.

6. A processor device as in claim 1 wherein said instruction stream transformation unit transforms blocks of code which are presumed hyper-blocks.

7. A processor device as in claim 1 wherein said instruction stream transformation unit transforms blocks of code which are denoted as hyper-blocks in original instruction set architecture code.

8. A processor device as in claim 1 wherein said instruction stream cache comprises means of using a tag for each cache line to denote whether the tag is a start of a hyper-block.

9. A processor device as in claim 1 wherein said instruction stream cache comprises means of using a hyper-block ID as an alternative way of addressing a transformed block of code.

10. A processor device as in claim 9 wherein said instruction stream cache comprises means of storing a plurality of hyper-block lines that are chained together using a common hyper-block ID plus pointers.

11. A processor device as in claim 1 wherein said instruction stream cache only hits when a transformed block of code is entered starting from the first instruction of the block.

12. A processor device as in claim 1 wherein said instruction stream transformation unit comprises means of instruction re-ordering.

13. A processor device as in claim 1 wherein said instruction stream transformation unit comprises means of performing predication if-conversion to convert an if-then-else construct in said code into a predication calculation and a series of predicated instructions that conditionally commit their results depending on the results of said predication calculation.

14. A processor device as in claim 1 wherein said instruction stream transformation unit comprises means of converting a load instruction into a speculative load and a load activation instruction pair,
whereby the possibility of more efficient scheduling of the transformed code is enabled by allowing the speculative load to be scheduled earlier than a normal load could be scheduled without this conversion thus minimizing possible waiting during execution for this memory load to complete.

15. A processor device as in claim 1 wherein said instruction stream transformation unit comprises a parallel dependency detector circuit for detecting possible dependencies between instructions,
whereby said instruction stream transformation unit can efficiently detect said possible dependencies during the process of instruction stream transformation.

16. A processor device as in claim 1 wherein said instruction stream transformation unit transforms said code blocks by dividing long instruction sequences into sequences of a defined maximum number of instructions called an instruction window that is equal to a number of instructions that said instruction stream transformation unit can work with effectively.

17. A processor device as in claim 16 wherein said instruction stream transformation unit transforms said code blocks by dividing long instruction sequences into overlapping sequences of a defined maximum number of instructions called overlapping instruction windows,
whereby this enables the efficient scheduling of code both within the middle of instruction windows and within the overlap regions between instruction windows.

18. A processor device as in claim 1 wherein said instruction stream transformation unit comprises means of creating a dependency matrix to represent potential dependencies between instructions,
whereby the dependency matrix provides dependency information in an efficiently accessed manner for the instruction stream transformation unit.

19. A processor device as in claim 18 wherein said instruction stream transformation unit comprises means of creating an operand mapping table to represent potential writes of operands by instructions,
whereby said operand mapping table enables dependencies between instructions to be detected efficiently and for the dependency matrix to be built efficiently by said instruction stream transformation unit.

20. A processor device as in claim 19 wherein said instruction stream transformation unit comprises means of performing register renaming to rename uses of registers in the transformed code blocks when necessary to minimize write-after-write hazards between write instructions,
whereby scheduling dependencies caused by said write-after-write hazards is reduced.

21. A processor device as in claim 20 wherein said register renaming by the instruction stream transformation unit allocates a set of physical registers that are separate from a second set of registers allocated by dynamic register renaming done by the execute unit,
whereby said instruction stream transformation unit and said execute unit are each able to independently allocate physical registers for register renaming without conflicting with each other.

22. A processor device as in claim 1 wherein the instruction stream transformation unit comprises means of performing an instruction scheduling algorithm to schedule a code block.

23. A processor device as in claim 22 wherein said scheduling algorithm is a list scheduling algorithm comprising the steps of
doing a basic forward iterative traversal to calculate the minimum cycle number of each instruction in said block from the start of said block,
propagating the depth of each leaf instruction to all its predecessors to calculate each instruction's priority as defined by the depth of its deepest child, and
performing a second forward iterative traversal to schedule instructions for execution cycle-by-cycle, where the scheduling priorities are used in conjunction with a ready list of instructions that are ready to be scheduled because all dependencies have been resolved.

24. A processor device as in claim 1 wherein
said execute unit comprises means of performing dynamic memory disambiguation,
said transformed instruction set architecture supports notations for indicating ambiguous memory operations,
and said instruction stream transformation unit calculates said notations for indicating ambiguous memory operations.

25. A processor device as in claim 24 wherein said instruction stream transformation unit comprises means of creating an ambiguous memory dependency matrix.

26. A processor device as in claim 24 wherein said instruction stream transformation unit comprises means of converting an ambiguous memory read instruction into a speculative read and a read check instruction pair.

27. A processor device as in claim 1 comprising a dynamically-scheduled execute unit.

28. A processor device as in claim 1
wherein the transformed instruction set architecture comprises dependency notation means of explicitly describing dependencies between instructions, and
wherein the instruction stream transformation unit calculates dependency notations for said code blocks during the process of transforming said code blocks into said transformed instruction set architecture,
whereby the transformed code blocks can be executed without having to redetect all static dependencies.

29. A processor device as in claim 28 wherein said means of explicitly describing dependency notation means allows instructions to be grouped into mini-tuples for dependency notations.

30. A processor device as in claim 28 wherein said dependencies are represented by dependency pointers in the transformed instruction set architecture.

31. A processor device as in claim 28 wherein said dependencies are represented by dependency vectors in the transformed instruction set architecture.

32. A processor device as in claim 1 further comprising means to perform semi-dynamic instruction code re-writing and re-scheduling,
whereby the code can be further optimized based on run-time information compared to code that is transformed only once through the instruction stream transformation unit.

33. A processor device as in claim 1 further comprising at least one run-time history table.

34. A processor device as in claim 1 comprising a value prediction history table to record the history of success or failure of previous executions of value predictions,
   whereby run-time behavior about value predictions can be recorded in order to help optimize subsequent instruction scheduling.

35. A processor device as in claim 1 comprising a predicate history table to record the history of previous executions of predicate calculation instructions,
   whereby run-time behavior about predicates can be recorded in order to help optimize subsequent instruction scheduling.

36. A processor device as in claim 1 comprising
   a data cache and
   a data hit/miss history table to record the history of whether previous executions of memory access instructions were hits or misses in said data cache,
   whereby run-time behavior about data hit/misses can be recorded in order to help optimize subsequent instruction scheduling.

37. A processor device comprising an ambiguous memory conflict history table to record the history of whether previous executions of promoted ambiguous read instructions cause memory conflicts or not,
   wherein said processor device uses the history recorded in said ambiguous memory conflict history table as a predictive indicator of the likelihood of memory conflicts in subsequent executions in order to affect the scheduling order of said promoted ambiguous read instructions relative to other instructions in subsequent executions,
   whereby run-time behavior about ambiguous memory conflicts can be recorded in order to help optimize subsequent instruction scheduling.

38. A method of providing precise interrupts in a processor implementing instruction stream transformation comprising the steps of
   mapping an original instruction set architecture instruction to an equivalent group of one or more transformed instruction set architecture instruction(s),
   using physical registers that have not been committed to logical registers to hold results, and
   allowing the final instruction in said group to commit the physical register result(s) to logical register(s).

39. A method of providing precise interrupts in a processor implementing instruction stream transformation comprising the steps of
   assigning an instruction sequence number to each original instruction set architecture instruction starting from the beginning of the code block,
   marking each transformed instruction set architecture instruction with the corresponding instruction sequence number, and
   committing the results of instructions in order of the instruction sequence numbers.

40. A processor device as in claim 1 comprising
   means of executing instructions from an instruction set architecture
   wherein the instruction set architecture explicitly notes dependencies between instructions by using dependency vectors,
   and wherein said processor device stores said instructions including said dependency vectors for possible repeated execution.

41. A processor device as in claim 1 comprising
   means of executing instructions from an instruction set architecture
   wherein the instruction set architecture explicitly notes dependencies between instructions by using dependency pointers,
   and wherein said processor device stores said instructions including said dependency pointers for possible repeated execution.

42. A processor device as in claim 1 wherein said means of storing and later fetching said transformed code block that spans more than one cache line in said instruction stream cache comprises means of using data structures to associate together multiple cache lines that each store a portion of said transformed code block.

* * * * *